US009954619B2

(12) United States Patent
Fok et al.

(10) Patent No.: US 9,954,619 B2
(45) Date of Patent: Apr. 24, 2018

(54) PHOTONIC IMPLEMENTATION OF JAMMING AVOIDANCE RESPONSE

(71) Applicant: University of Georgia Research Foundation, Inc., Athens, GA (US)

(72) Inventors: Mable P. Fok, Bishop, GA (US); Ryan Toole, Woodstock, GA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 0 days.

(21) Appl. No.: 15/335,672

(22) Filed: Oct. 27, 2016

(65) Prior Publication Data

US 2017/0117968 A1    Apr. 27, 2017

Related U.S. Application Data

(60) Provisional application No. 62/246,903, filed on Oct. 27, 2015.

(51) Int. Cl.
| | |
|---|---|
| *H04K 3/00* | (2006.01) |
| *H04B 10/54* | (2013.01) |
| *H04B 10/70* | (2013.01) |
| *H04B 10/80* | (2013.01) |
| *H04B 10/548* | (2013.01) |

(Continued)

(52) U.S. Cl.
CPC ......... *H04B 10/54* (2013.01); *H04B 10/2575* (2013.01); *H04B 10/548* (2013.01); *H04B 10/70* (2013.01); *H04B 10/80* (2013.01); *H04J 11/003* (2013.01); *H04K 3/226* (2013.01); *H04K 3/25* (2013.01); *H04K 3/827* (2013.01); *H04L 27/0006* (2013.01)

(58) Field of Classification Search
None
See application file for complete search history.

(56) References Cited

U.S. PATENT DOCUMENTS 6,327,245 B1 * 12/2001 Satyanarayana ....... H04K 3/226
                                                              370/229

OTHER PUBLICATIONS

Fujita et al: "A neuromorphic MOS circuit imitating jamming avoidance response of Eigenmannia." Nonlinear Theory and Its Applications, IEICE, vol. 2, No. 2, Apr. 2011, pp. 205-217.*

(Continued)

*Primary Examiner* — Li Liu
(74) *Attorney, Agent, or Firm* — Thomas | Horstemeyer, LLP

(57) ABSTRACT

Various examples are provided for jamming avoidance response (JAR), and photonic implementations thereof. In one example, a method includes generating optical pulses that correspond to raising envelope of a beat signal associated with an interference signal and a reference signal; generating optical spikes that correspond to positive zero crossing points of the reference signal; providing a phase output that indicates whether the beat signal is leading or lagging the reference signal, the phase output based at least in part upon the optical spikes; and determining an adjustment to the reference frequency based at least in part upon the optical pulses and the phase output. In another example, a JAR system includes a photonic P-unit to generate the optical pulses; a photonic ELL/T-unit to generate the optical spikes; a photonic TS unit to provide the phase output; and a logic unit to determine the adjustment to the reference frequency.

20 Claims, 22 Drawing Sheets

(51) Int. Cl.
H04B 10/2575 (2013.01)
H04J 11/00 (2006.01)
H04L 27/00 (2006.01)

(56) References Cited

OTHER PUBLICATIONS

J. LeMoncheck: "An analog VLSI model of the jamming avoidance response in electric fish." IEEE journal of solid-state circuits vol. 27, No. 6, Jun. 1992), pp. 874-882.*

Prucnal e al: "Lightwave Neuromorphic Signal Processing", 2011 ICO International Conference on Information Photonics (IP), May 18-20, 2011.*

Fok et al: "Signal feature recognition based on lightwave neuromorphic signal processing", Optics Letters, vol. 36, No. 1, Jan. 1, 2011, pp. 19-21.*

Fok et al, "Pulse lead/lag timing detection for adaptive feedback and control based on optical spike-timing-dependent plasticity", Optics Letters, Vo. 38, No. 4, Feb. 15, 2013, pp. 419-421.*

Fok, Mable P., and Paul R. Prucnal. "All-optical XOR gate with optical feedback using highly Ge-doped nonlinear fiber and a terahertz optical asymmetric demultiplexer." Applied optics 50.2 (Jan. 2011): 237-241.

Fok, Mable P., and Ryan Toole. "Photonic Approach for RF Jamming Avoidance Response System Inspired by the Fish—Eigenmannia." IEEE Photonics Society News, vol. 29, No. 6 (Dec. 2015).

LeMoncheck, John E. "An analog VLSI model of the jamming avoidance response in electric fish." IEEE journal of solid-state circuits 27.6 (Jun. 1992): 874-882.

Fujita, Daichi, Tetsuya Asai, and Yoshihito Amemiya. "A neuromorphic MOS circuit imitating jamming avoidance response of Eigenmannia." Nonlinear Theory and Its Applications, IEICE 2.2 (2011): 205-217.

* cited by examiner

| P Unit (Beat) Amplitude Information | P Unit - TS Phase Information | Decision from Logic |
|---|---|---|
| Increasing (1) | $f_B$ Leading $f_E$ (0) | Increase (1) |
| Increasing (1) | $f_B$ Lagging $f_E$ (1) | Decrease (0) |
| Decreasing (0) | $f_B$ Leading $f_E$ (0) | Decrease (0) |
| Decreasing (0) | $f_B$ Lagging $f_E$ (1) | Increase (1) |
FIG. 8
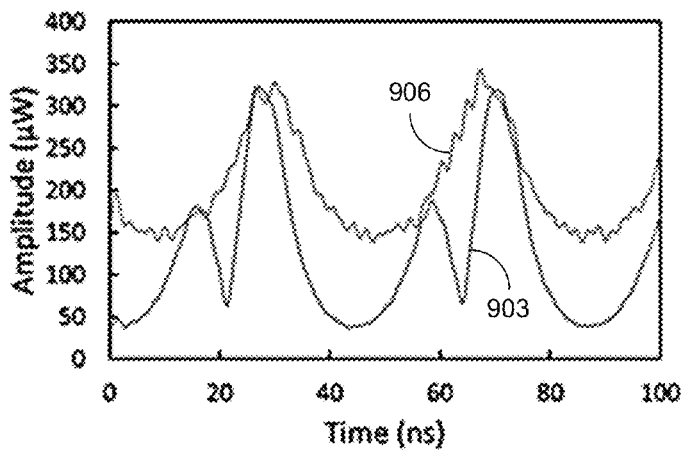
FIG. 9A
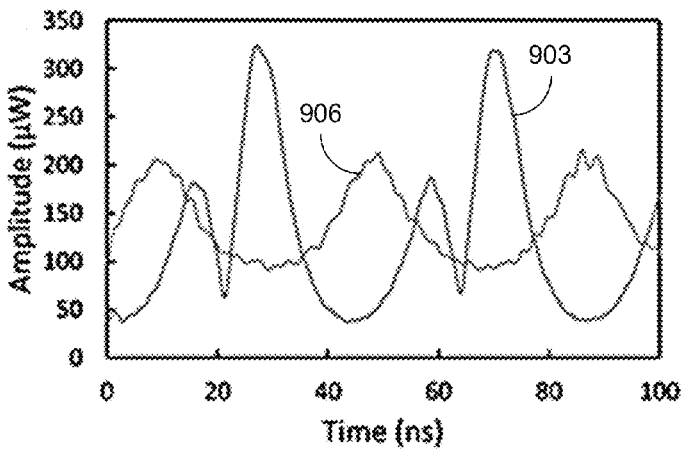
FIG. 9B

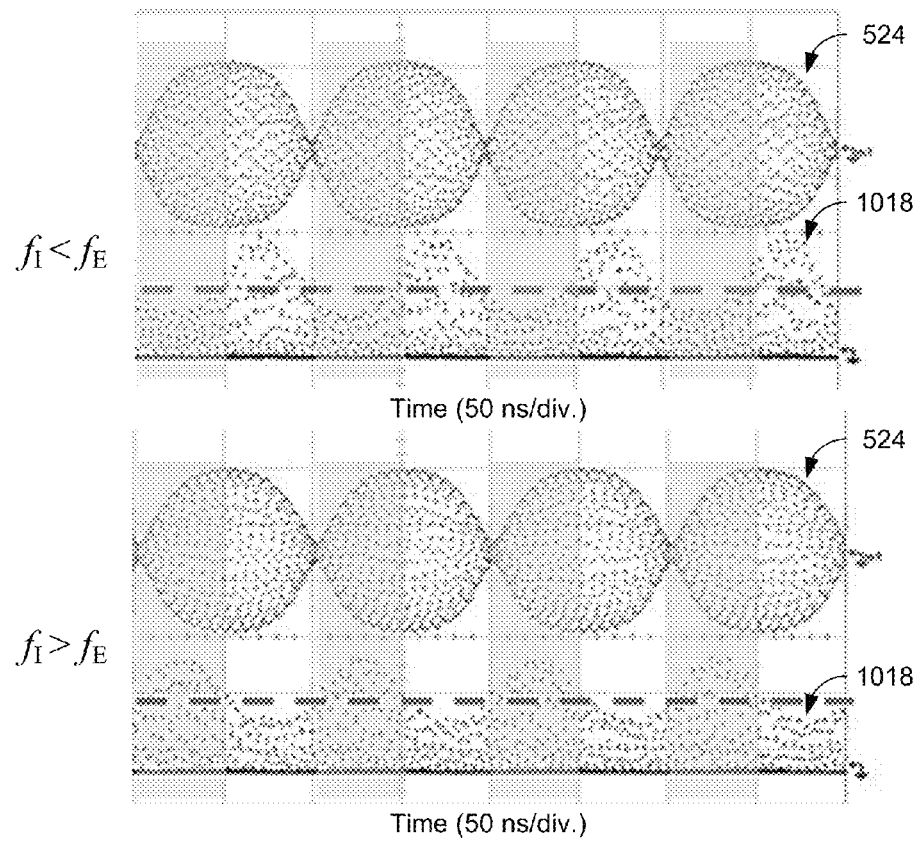
FIG. 10E
FIG. 10F
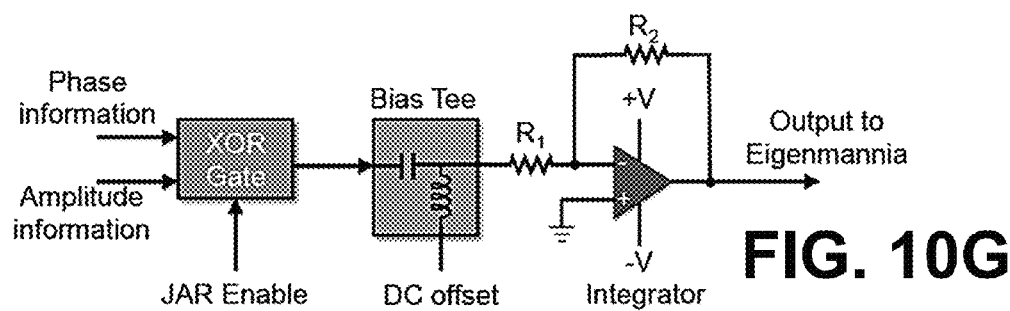
FIG. 10G

PHOTONIC IMPLEMENTATION OF JAMMING AVOIDANCE RESPONSE

CROSS REFERENCE TO RELATED APPLICATIONS

This application claims priority to, and the benefit of, U.S. provisional application entitled "Photonic Implementation of Jamming Avoidance Response" having Ser. No. 62/246,903, filed Oct. 27, 2015, which is hereby incorporated by reference in its entirety.

BACKGROUND

The radio frequency (RF) spectrum is a scarce resource for both licensed and unlicensed applications. The prevalence of wireless devices and the progression of communications technology have facilitated the vision of anytime, anywhere access to wireless networks, as well as for radar system to gain ubiquitous access to the target. Ubiquitous access has recast modern communication and introduced a new level of strain on networks, making such systems more susceptible to radio interference, unfriendly jamming, and advertent jamming. Traditionally, the Federal Communications Commission (FCC) has controlled the radio frequency spectrum in an effort to minimize these issues by allotting bands to different applications and users, including commercial, defense, and civilian applications. Considering the recent boom in wireless technologies, those unlicensed bands left open for public use are often over-crowded and consequently suffer from radio interference, which is difficult to mitigate due to the wide range of devices that operate at such frequencies. Further licensing of personal devices would aid in minimizing interference; however, it would severely reduce the flexibility of the public bands. The frequency ranges open for personal and commercial use are limited, and placing additional restrictions could prove too complex of a task that leads to further complications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is a table illustrating JAR decisions based on P-unit and TS inputs of the photonic JAR circuitry of FIG. 4, in accordance with various embodiments of the present disclosure.

FIGS. 9A through 9H illustrate examples of inputs for various interference scenarios of the photonic JAR circuitry of FIG. 4, in accordance with various embodiments of the present disclosure.

FIGS. 10B-10F shows waveforms generated by the photonic JAR circuitry of FIG. 10A, in accordance with various embodiments of the present disclosure.

FIG. 10G is a schematic diagram illustrating an example of the logic and control circuitry of the photonic JAR circuitry of FIG. 10A, in accordance with various embodiments of the present disclosure.

DETAILED DESCRIPTION

Figure 1:
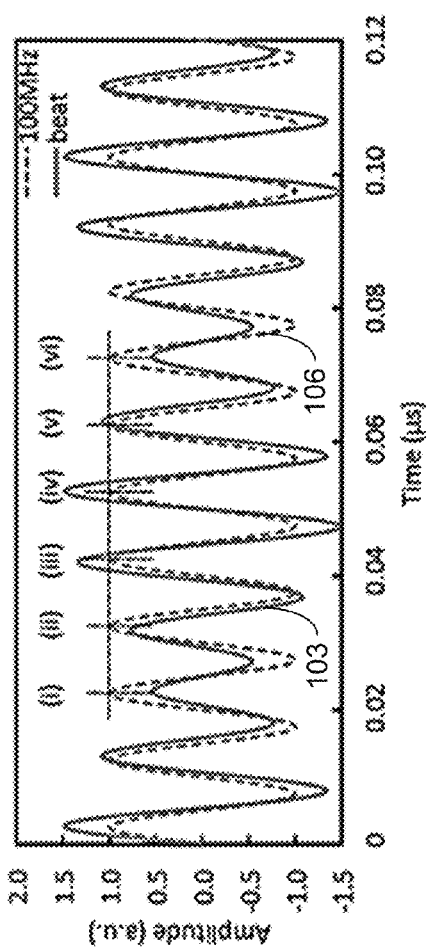
FIG. 1 is a plot illustrating an example of a beat signal and a reference signal, in accordance with various embodiments of the present disclosure.

Disclosed herein are various embodiments related to jamming avoidance response (JAR). Reference will now be made in detail to the description of the embodiments as illustrated in the drawings, wherein like reference numbers indicate like parts throughout the several views.

Dynamic spectrum access, opportunistic spectrum access, spectral partitioning, and channelizing represent proposed approaches towards tackling this issue, but all require some degree of control communication between devices, which could similarly be impacted by interference due to overcrowding. Another major research focus, cognitive radio, involves the use of weak probe signals that scan the spectrum for "spectral holes," regions of the spectrum not being actively used. Spectrum sensing over a large bandwidth can be difficult, however, due to difficulties arising from avoiding interference caused by the probing with an individual device over a range of frequencies. A dynamic approach to managing spectrum scarcity, as opposed to static spectrum allocation, can allow for efficient use of the frequency spectrum for radio frequency (RF) communications.

The approach of the present disclosure was inspired by the neural circuitry of the Eigenmannia, a genus of fish, and avoids the possibility of causing interference through probing and comprehensive spectral scanning. The Eigenmannia use electrolocation to determine their surroundings by generating electric fields and detecting disturbances in the field caused by nearby objects. For these creatures, their ability to effectively make sense of their surroundings is a life or death necessity, and their neural circuitry has evolved to reflect this. An individual fish emits and receives a low frequency electrical signal in the low kilohertz range, while simultaneously being able to sense the frequency output of other nearby Eigenmannia, and automatically regulates its own frequency in an effort to avoid interference and jamming.

This regulation of frequency, known as jamming avoidance response (JAR), represents a method of uncoordinated communication that can be applied in modern wireless and radar systems, eliminating the need for further restriction of the unlicensed FCC bands and allowing for maximum spectrum efficiency in all bands. The ability for an individual unit to adjust its output frequency based on observed interference can be achieved with no direct coordination with other units in the system, and is therefore ideal for the cluttered complexity that defines unlicensed frequency bands. The JAR approach towards detecting and using spectral holes is a practical means of solving a physical problem that avoids indirectly, incompletely mitigating the issue by managing networks with excessive protocol.

A photonic approach to JAR is ideal considering the flat frequency response of photonic devices in the terahertz range, their electromagnetic (EM) immunity, and near-instantaneous response times. The uniform frequency response is of particular importance in this scenario considering the lack of a priori knowledge of which frequencies are available in a system. Furthermore, processing of unknown signals in the RF range is not efficient and often impossible electronically due to the bandwidth limitation and precise design needed in electronics for different frequency bands. On the other hand, it is possible to optically achieve this due to the consistent performance of optical device over a wide range of frequencies. In this disclosure, a photonic JAR circuit is developed through simulation and experiment using linear and nonlinear optical effects and techniques used in photonic neuromorphic processing systems. The device can serve as a primitive example of a solution to the spectral scarcity and inadvertent jamming issues that will continue to build in severity if not handled on the physical level. With the photonic JAR, radio interference and jamming can be avoided and a more spectrally efficient, automatic, and self-adaptive RF communication system can be realized.

As previously stated, the Eigenmannia genus represents a categorization of weakly electric fish that use electrolocation as a means of sensing and moving through their surroundings in the ocean. An Eigenmannia fish also discharge a low frequency signal to communicate with other Eigenmannia nearby. If another fish is nearby and emitting a signal at a similar frequency, the two fish will be jamming each other due to interference, disable their ability to communicate. Accordingly, their neural circuitry is able to process amplitude and phase information of the interference signal, determine whether it's higher or lower in frequency relative to the fish's own discharge frequency, and then automatically shift its discharge to a different operating frequency. Interestingly, this adjustment is always made in the proper direction (i.e., the operating frequency will be lowered if the interfering signal is higher in frequency than the reference or raised if the interfering signal is lower in frequency). This implies that the process is not one of haphazard, random switching but a systematic response to accurate information drawn from the detected interference waveform.

The process by which JAR takes place is most easily described by a phasor phenomenon. When a reference sinusoid signal at frequency $f_E$ interfered by another sinusoid signal of similar frequency $f_I$, a beat envelope signal results at a frequency $|f_b|=f_E-f_I$. Referring to FIG. 1, shown is a plot illustrating an example of a 20 MHz beat signal (solid line 103) alongside a 100 MHz reference sinusoid signal (dashed line 106), generating from the reference beating with an 80 MHz interfering sinusoid signal.

As illustrated by FIG. 1, the individual peaks of the 20 MHz beat 103 rotate clockwise around the peaks of the 100 MHz reference signal 106 if the interfering signal is at a lower frequency of 80 MHz, e.g., at points (i)-(vi) in FIG. 1. The rotation direction uniquely determines the sign of the frequency difference.

Figure 2A:
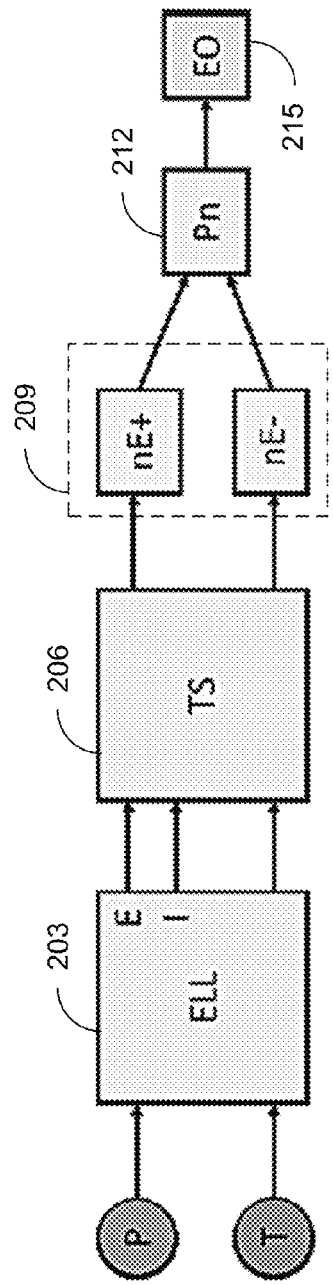
FIG. 2A is a schematic diagram illustrating an example of Eigenmannia neural circuitry for jamming avoidance response (JAR), in accordance with various embodiments of the present disclosure.

FIG. 2A shows a simplified schematic diagram illustrating the neural circuitry of the Eigenmannia that achieves the JAR. The neural circuitry includes P, T, E, and I-units, the electrosensory lateral line lobe (ELL) 203, the torus semicircularis (TS) 206, nucleus electrosensorius (nE) 209, pacemaker nucleus (Pn) 212, and the electric organ (EO) 215. The P, E, and I-units convey beat amplitude information and the T-unit and components of the TS 206 convey phase information. Logic performed by other TS elements excite the nE+ or nE− neurons 209, increasing or decreasing the frequency of the discharge regulated by the Pn 212, and ultimately transmitted by the EO 215.

The simplified Eigenmannia JAR neural circuitry begins with two different types of electroreceptors located on the body's surface, the T-unit and the P-unit. The P-unit is primarily responsible for interpreting information about the amplitude of beat signal and consists of a cluster of neurons that fire rapidly when the beat is increasing in amplitude and fire slowly when the beat is decreasing in amplitude. The T-unit neurons process phase information of the reference signal by firing at every positive zero crossing point of reference discharge. The outputs of the T-unit and P-unit receptors are both sent to the ELL 203, in which the amplitude and phase information are independently processed. As shown in FIG. 2A, the ELL 203 includes the E and I-units. A rapid firing rate of the P-unit results in the E-unit firing and a slow firing rate results in the I-unit firing. Furthermore, the ELL 203 serves to reduce any timing jitter of phase information arriving from the T-unit, before then sending it to the TS 206 alongside the E-unit and I-unit spikes.

By comparing the positive zero crossing points within the beat signal 103 (FIG. 1) to that of the reference signal 106 (FIG. 1), the TS 206 is able to determine whether the beat signal crossing points are leading or lagging the reference crossing points by outputting different spiking patterns. The unit then performs a logical operation on the lead/lag phase information and the increasing/decreasing amplitude information, from which it decides whether to increase or decrease the discharge frequency of the fish by stimulating the nucleus electrosensorius (nE+ and nE−) 209 and ultimately the pacemaker nucleus (Pn) 212, which sets a new output frequency to be transmitted by the electric organ (EO) 215. The JAR decisions based on the multiple inputs from the P-unit and TS 206 is summed up in the table of FIG. 2B, which compares the decision with its input amplitude and phase information, indicating an XNOR or XOR behavior.

Figures 2B, 3A:
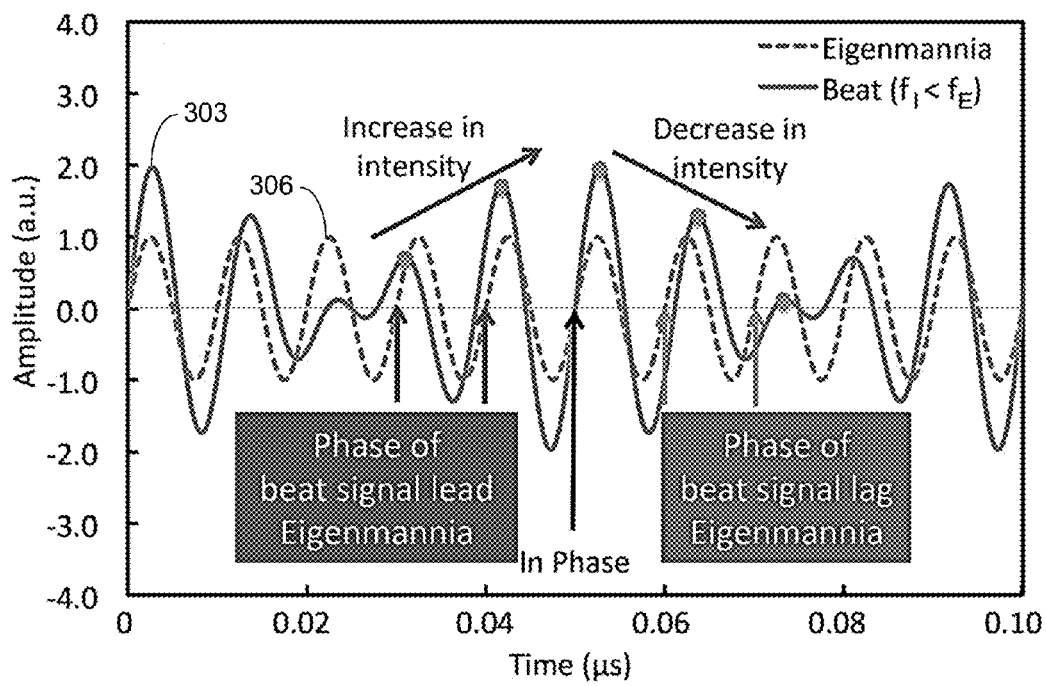
FIG. 2B is a table illustrating JAR decisions based on P-unit and TS outputs of the Eigenmannia neural circuitry of FIG. 2A, in accordance with various embodiments of the present disclosure.
FIGS. 3A and 3B illustrate an example of TS operation principle, in accordance with various embodiments of the present disclosure.
Figure 3B:
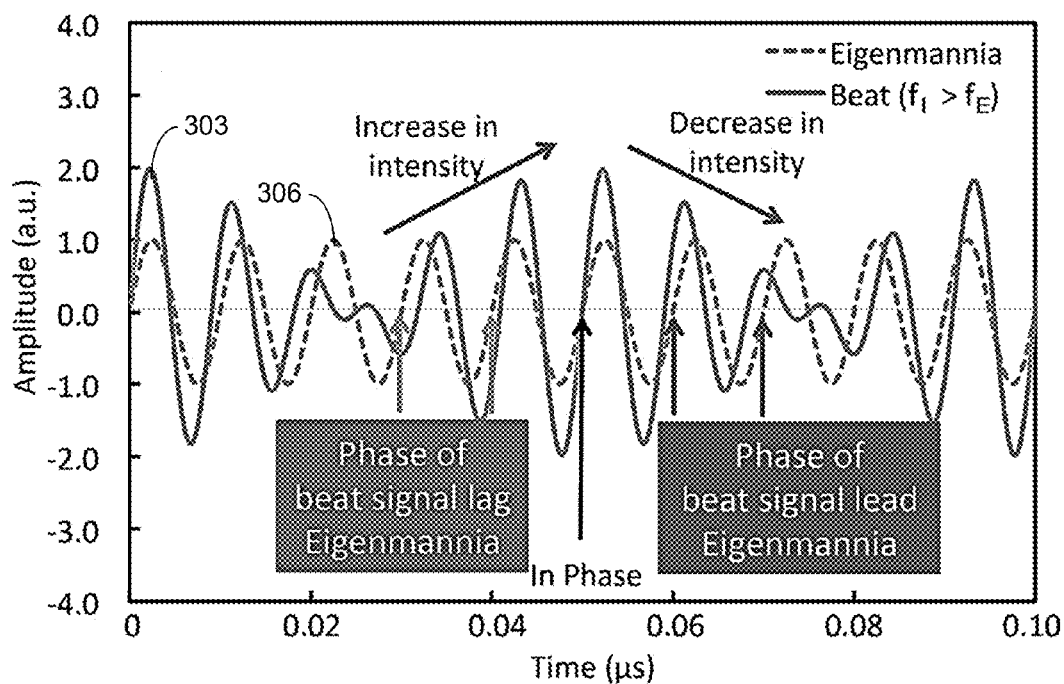

FIGS. 3A and 3B illustrate the JAR logic operation, when the interfering frequency $f_I$ is lower than the reference frequency $f_E$, and when $f_I$ is higher than $f_E$, respectively. The beat signal (solid line 303) and reference signal (dashed line 306) are shown with arrows pointing to different reference positive zero crossing points in which the beat signal is either leading or lagging the reference signal 306 in phase and the beat 303 is either increasing or decreasing in envelope amplitude. FIGS. 3A and 3B show the TS operation principle given an original reference frequency $f_E$ of 100 MHz, with FIG. 3A portraying the scenario in which the interfering signal frequency $f_I$ is at 80 MHz, and FIG. 3B depicting the scenario in which the interference frequency $f_I$ is at 120 MHz.

As can be seen in FIG. 3A, the nearest positive zero crossing point of the beat 303 is leading the nearest crossing point of the reference sinusoid 306 ($f_I$ lead $f_E$) at the rising beat envelope and trailing at the falling beat envelop of the beat 303. The opposite trend ($f_I$ lag $f_E$) is displayed in FIG. 3B for an interfering frequency $f_I$ greater than the reference frequency $f_E$. An optical implementation of the neural circuitry of FIG. 2A is described below, which makes use of several different signal processing techniques towards determining beat amplitude information and interfering signal phase information.

Photonic Jamming Avoidance Response Circuitry

The basic understanding of the Eigenmannia JAR neural circuitry of FIG. 2A serves as a rough guideline for developing a photonic equivalent. Considering that the reference frequency of most wireless transmitters is readily available from the local oscillator (LO), the reference signal can be split and sent to the transmitter and to the T-unit directly. The ELL 203 no longer processes information from both the T-unit (phase coder) and P-unit (probability coder), thus the photonic circuit can be divided into four major elements or subsystems for implementation.

A P-unit, which can comprise an envelope detector and a circuit that detects the rising edge of the beat envelope and emits an optical pulse correspondingly.

A T-unit & ELL (or ELL/T-unit), which works to fire spikes at every positive zero crossing point of the local oscillator's output sinusoid.

A TS, which receives input directly from a receiver in the form of two beating RF signals and from the T-unit & ELL in the form of a train of spikes temporally indicating the positive zero crossing points of the transmitter signal. The TS can use optical effects to determine whether the interfering signal zero crossing points are leading or lagging the reference signal's zero crossing points and spikes accordingly.

A logic unit (gate), which interprets the phase and amplitude information from the previous units and decides whether the transmitter should increase or decrease its output frequency. This information instructs the frequency adjustment unit to control the signal generator and transmitter output is properly adjusted.

Figure 4:
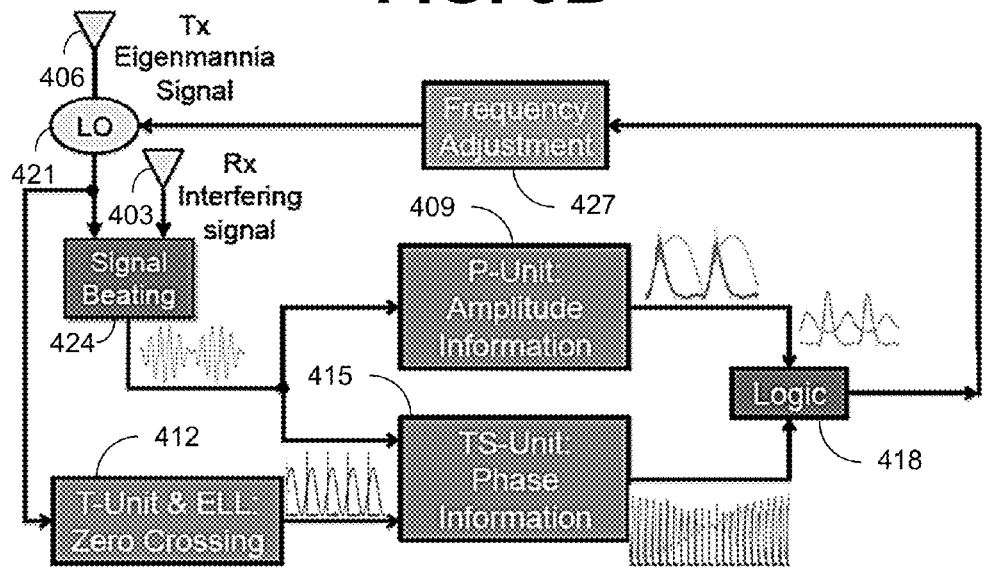
FIG. 4 is a schematic diagram illustrating an example of photonic JAR circuitry, in accordance with various embodiments of the present disclosure.

FIG. 4 shows a simplified schematic diagram illustrating an example of the photonic JAR circuit comprising a receiver (Rx) 403 and transmitter (Tx) 406, the P-unit 409 for interpreting beat amplitude information, the ELL/T-unit 412 for indicating the positive zero crossing points of a reference signal, the TS 415 for determining the phase of an interfering signal relative to the reference signal, the logic unit 418 for interpreting phase and amplitude information, and a local oscillator (LO) 421 for generating the reference signal. The photonic JAR circuit was simulated using optical communications simulation software (OptiSystem), which demonstrated how the photonic JAR would operate around 2.4 GHz in a wireless setting. A frequency adjustment (or control) unit 427 can be used to provide feedback to the LO 421 for adjustment of the generated frequency of the reference signal. The following sections provide further detail for these subsystems.

P-Unit—for the Detection of Rising Edge of the Beat Signal Envelope.

The JAR system of FIG. 4 can obtain a copy of its own RF signal for transmission (reference signal) and an interfering signal from an unknown location by means of an antenna connected to the Rx 403. Beating between the reference signal and the interference signal is first obtained by the signal beating device 424 and sent to the P-unit 409 where envelope detection is first performed to extract the envelope of the beat frequency. Then, the beat is converted to the optical domain where processing based on signal inversion, temporal offset and signal addition can be performed. Ultimately, the P-unit 409 emits an optical pulse at the rising edge of the envelope, and the resulting train of pulses is sent to the logic unit 418 along a precisely determined length of optical fiber.

Figure 5A:
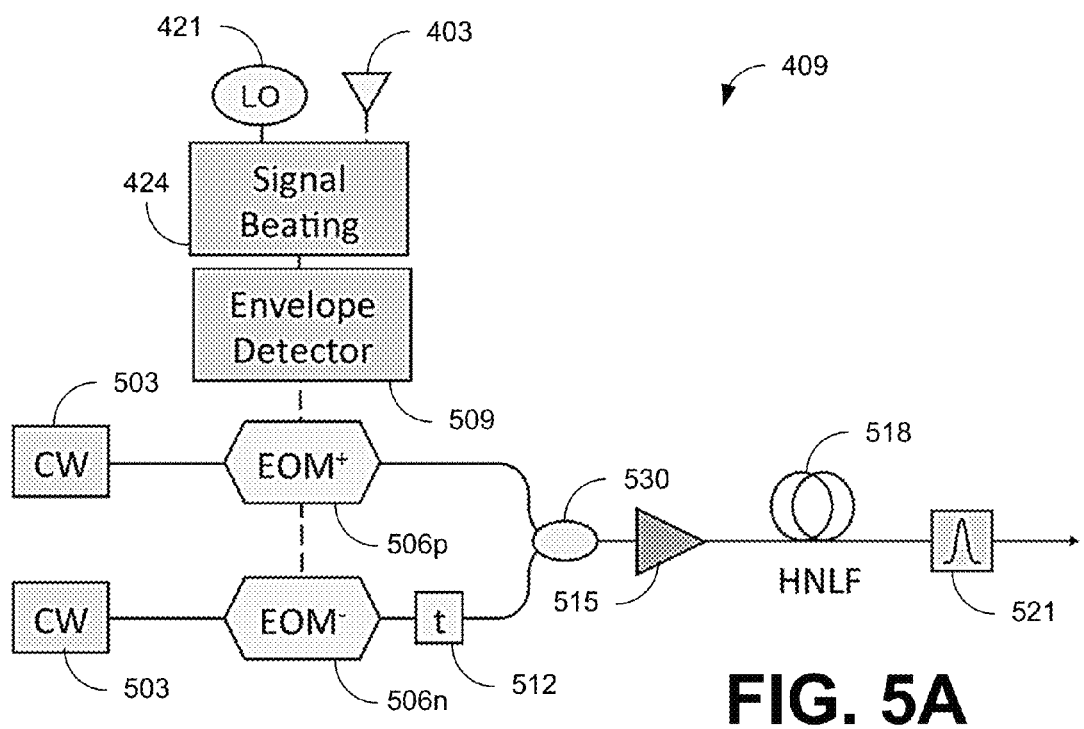
FIG. 5A is a schematic diagram illustrating an example of P-unit circuitry of the photonic JAR circuitry of FIG. 4, in accordance with various embodiments of the present disclosure.

Referring to FIG. 5A, shown is a schematic diagram illustrating an example of the photonic P-unit 409. The P-unit 409 can include two continuous wave (CW) optical sources 503, two electro-optic modulators (EOM), one positively biased 506$p$ and one negatively biased 506$n$, an envelope detector 509, a temporal delay 512, an optical amplifier 515, a length of highly nonlinear fiber (HNLF) 518 and a bandpass filter 521. In other implementations, different non-linear optical devices (e.g., a semiconductor optical amplifier (SOA), silicon wire waveguide or photonic crystal fiber) can be utilized in place of the HNLF 518.

Figure 5B:
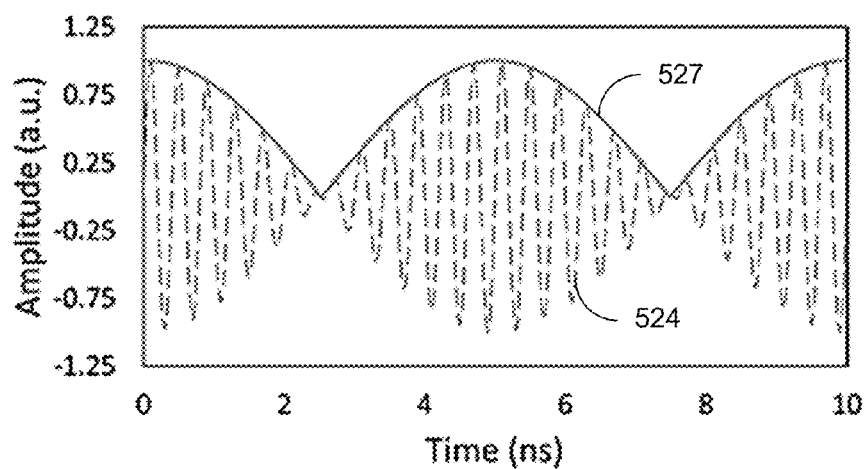
FIGS. 5B through 5K illustrate operation of the P-unit of FIG. 5A, in accordance with various embodiments of the present disclosure.

An envelope detector 509, in its most basic form, can be an RC circuit comprising a diode, a resistor and a capacitor, in which the capacitor stores charge at the rising edge of the signal, while releasing it slowly on the falling edge through the resistor. The diode performs rectification, allowing current flow in just one direction, with the end result being a signal that appears as a rectified sinusoid at the beat frequency. FIG. 5B illustrates an example of envelope detection, where the beat of two signals at 2.4 and 2.6 GHz is shown by the dashed curve 524, and the signal after envelope detection is indicated by the solid curve 527. More advanced envelope detectors are available that operate over an array of different frequencies and are suited for multiple applications. Due to the limitations of optical communications simulation software (OptiSystem) and the relatively simple nature of the envelope detection 509, simulation of the envelope detection 509 was not needed and the resulting signal was generated independently.

Referring back to FIG. 5A, the extracted envelope can be split into two branches and converted to an optical signal through use of two electro-optic intensity modulators (EOM), one is biased at the positive slope 506$p$ and one is biased at the negative slope 506$n$ so that a non-inverted copy and an inverted copy of the signal are obtained. The EOM 506 is an electro-optic device that comprises two phase modulators to achieve amplitude modulation through interference. In an EOM 506, an input optical signal is split between two branches, each containing a phase modulator. The phase modulator's index of refraction is a function of the strength of an applied varying field, which in this case is the amplitude-varying envelope signal. Due to the varying index of refraction, the input continuous wave (CVV) optical signal experiences a time-varying phase delay. Consequently, when the optical signals of both branches in the EOM 506 are recombined, they interfere and reproduce the modulated signal in the optical domain. Depending on the sign of an externally applied bias voltage, the resulting modulated signal is either upright or inverted.

Figure 5C:
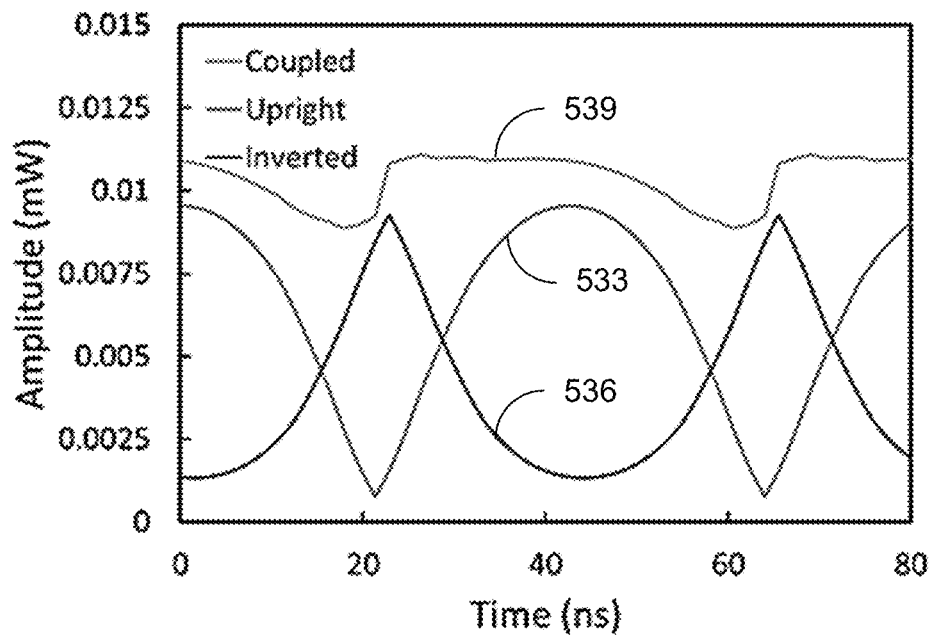
Figure 5D:
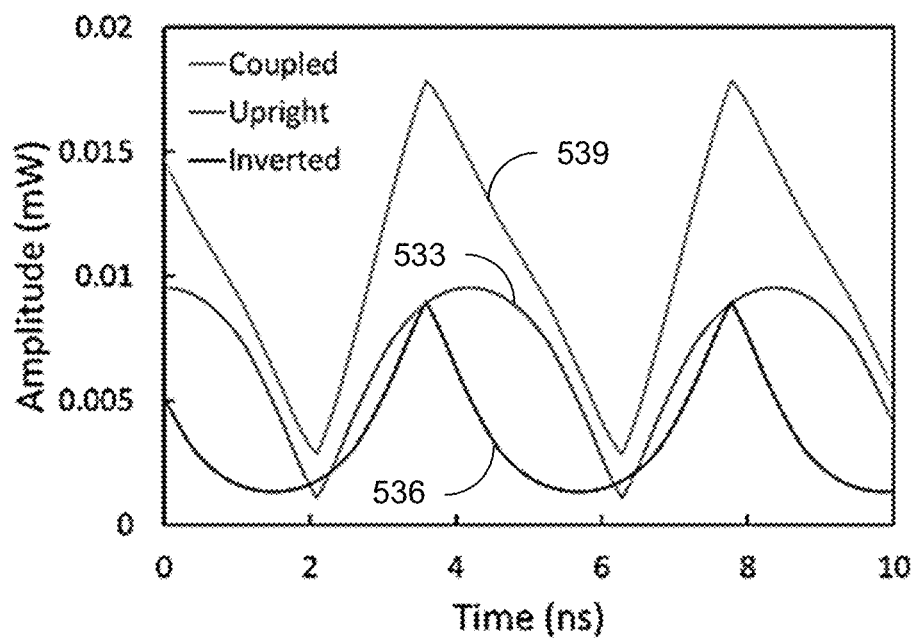

The two branches of the P-unit 409 are slightly offset, such that a slight temporal delay 512 (e.g., of 1.5 ns) is experienced in the branch of the negatively-biased EOM 506n before the two optical signals (e.g., at 1551 and 1552 nm, respectively) are combined at a fiber coupler 530, where their intensities are added together. For example, two optical signals modulated by an envelope corresponding to a beating 2.4 and 2.425 GHz signal are shown in FIG. 5C alongside the signal after the coupler. FIG. 5D depicts the same information but for a 240 MHz beat signal, corresponding to the beating between a 2.4 and 2.64 GHz signal. The optical signals from the positive-slope biased EOM 506p (FIG. 5A) are shown as curves 533, the optical signals from the negative-slope biased EOM 506n (FIG. 5A) are shown as curves 536, and the signals after coupling by coupler 530 (FIG. 5A) is shown as curves 539.

Figure 5E:
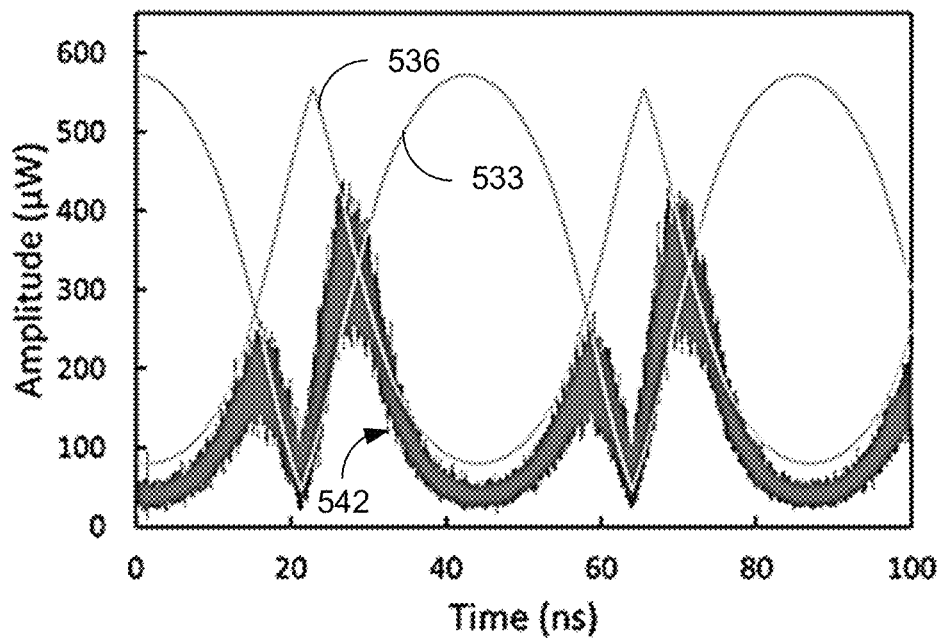
Figure 5F:
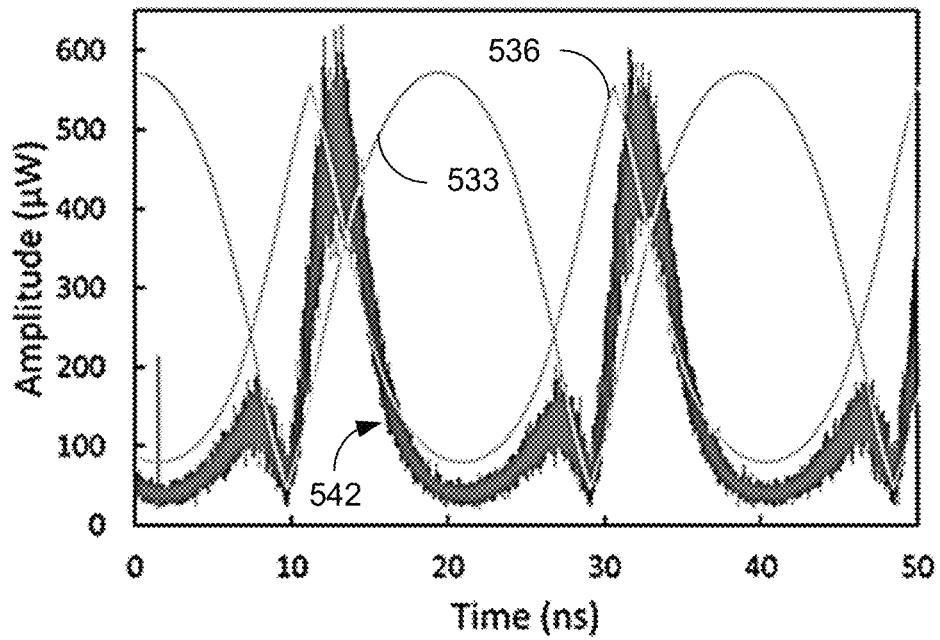
Figure 5G:
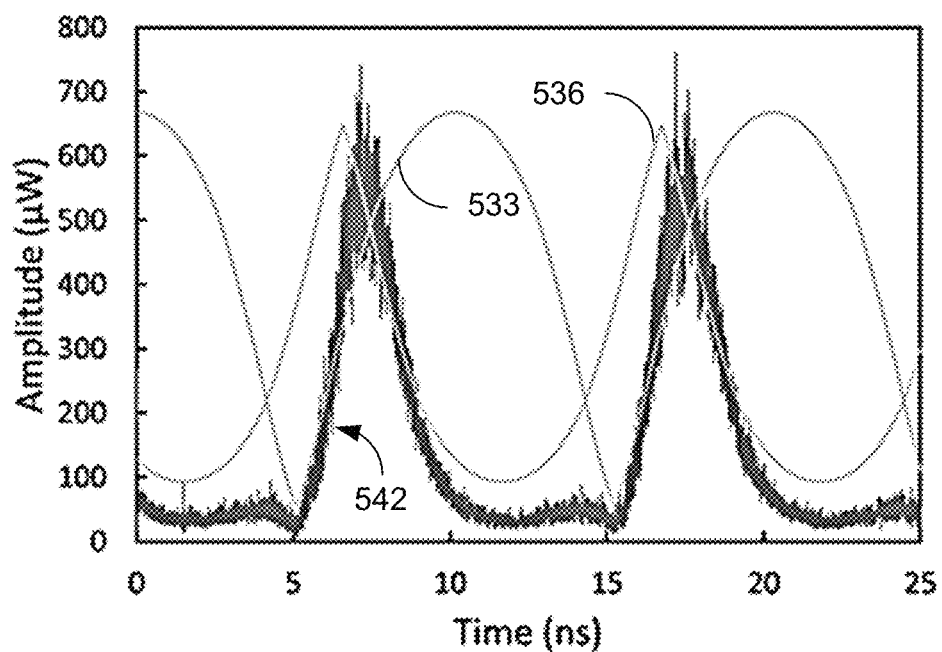
Figure 5H:
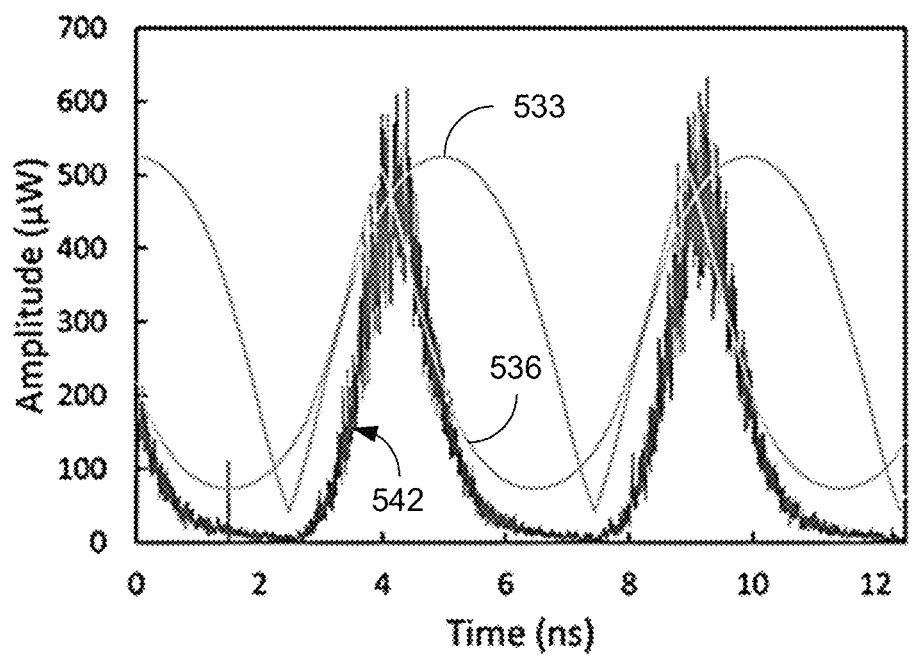
Figure 5I:
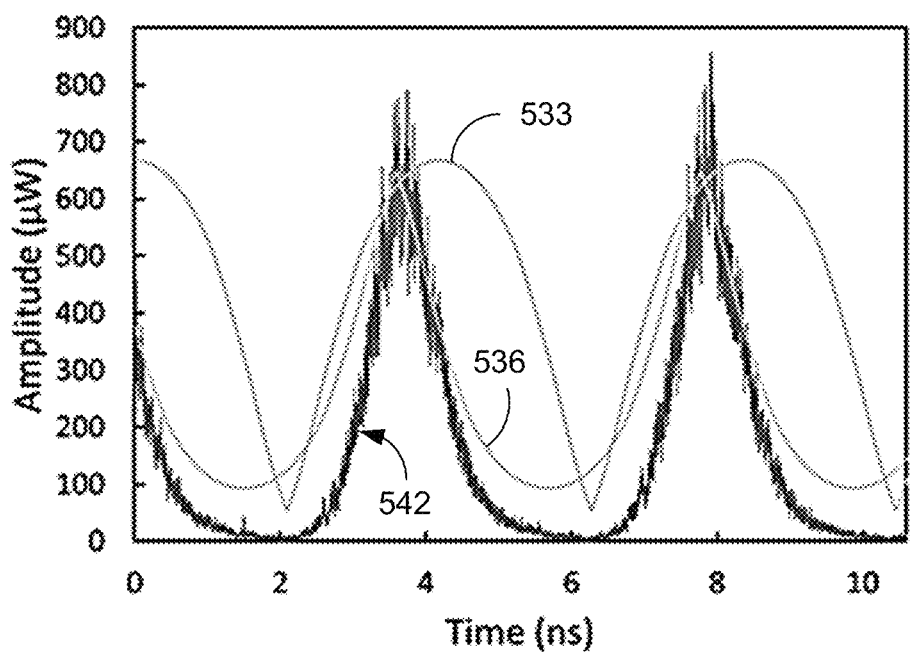

The final element in the P-unit 409 of FIG. 5A is a 10 m length of highly nonlinear fiber (HNLF) 518, in which the nonlinear optical effect of four-wave mixing (FWM) is utilized to produce a pulse at the rising edge of the beat. As the signals (curves 539 of FIGS. 5C and 5D) after coupling by coupler 530 do not maintain the same pulse shape over the range of beat frequencies, further processing can be used to emit a proper pulse. The processing technique used, FWM, occurs when at least two signals at different optical frequencies, $v_1$ and $v_2$, propagate through nonlinear media and produce two additional frequency components at $v_3=v_1-(v_2-v_1)$ and $v_4=v_2+(v_2-v_1)$, where $v_2>v_1$, assuming that the inputs are phase-matched. Because of the high optical power needed for FWM, the effect only occurs at the rising edge of the beat, where the two optical inputs are of sufficiently high power. The optical amplifier 515 preceding the HNLF 518 is initialized for lower frequency beats, which correspond to a small separation between the reference and interfering signal, such that output of the P-unit 409 is a spike temporally aligned to the crossing point between the two optical signals. Near this crossing point, the power of each signal is sufficiently high to induce a noticeable FWM effect, and a 0.3 nm bandpass filter 521 (e.g., centered at 1550 nm) passes the FWM product. FIG. 5E illustrates an example for a 25 MHz beat envelope.

For higher beat frequencies, a fixed temporal delay 512 (FIG. 5A) of, e.g., 1.5 ns shifts the inverted signal further along the rising edge of the envelope in terms of relative phase. This leads to a minor relative phase shift in the output of the P-unit 409 (FIG. 5A) for higher frequency signals as the power needed for FWM is effectively satisfied at all times corresponding to the peak amplitude of the inverted signal. This trend is further supported by the fixed bias current supplied to the amplifier 515. FIGS. 5E-5I show the output of the P-unit 409 for beat frequencies of 25, 50, 100, 200 and 240 MHz, respectively.

In FIGS. 5E-5I, the beat modulated optical signals 533 and 536, and the FWM products 542, are shown for interfering and reference signal separations of 25, 50, 100, 200 and 240 MHz, respectively. In each of the figures, the vertical axis corresponds to the P-unit spike amplitude, and the initial envelopes 533 and 536 are scaled down for reference. In actuality, the average power of the coupled inputs 533 and 536 was approximately 7 dBm for all tested beat frequencies, and the average output powers of the P-unit 409 were −12, −10.3, −7.8, −7.7, and −7.5 dBm for the 25, 50, 100, 200, and 240 MHz beats, respectively.

Figure 5J:
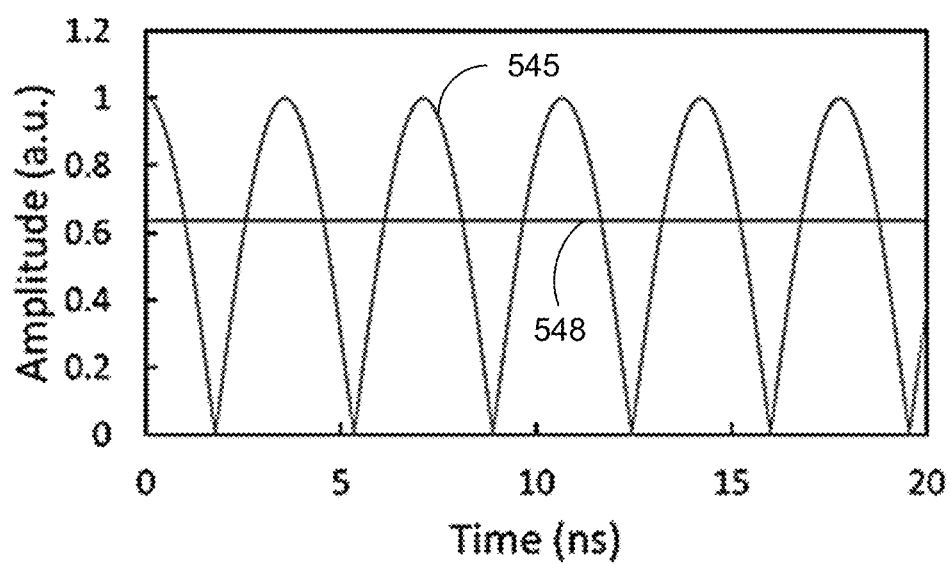
Figure 5K:
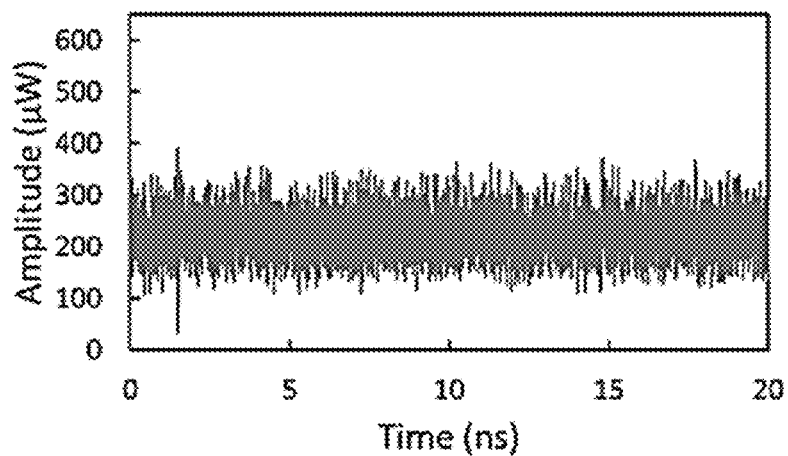

Considering that operation of the photonic JAR circuitry is not needed for frequencies that are sufficiently far apart to avoid interference, a 250 MHz bandpass filter can be positioned after envelope detection, preventing the modulation of any beat signal larger than this frequency onto the optical carriers. In such a scenario the two optical signals then fail to initialize FWM, and the P-unit 409 entirely stops spiking—disabling the JAR operation. FIG. 5J illustrates the effect of a 280 MHz envelope before and after a low pass filter, and FIG. 5K shows the output of the P-unit.

The 250 MHz low-pass filter prevents the P-unit 409 from spiking at the rising edges of a 280 MHz beat. In FIG. 5J, the 280 MHz beat is indicated by curve 545 prior to filtering and the straight line 548 represents the signal after filtering. As shown in FIG. 5K, the P-unit 409 does not spike as FWM fails to occur. Evidently, conversion of the envelope to the optical domain fails, resulting in no output from the P-unit 409. Also, the bandpass filter prevents any issues related to the fixed delay line from arising. For instance, for beats larger than about 333 MHz the delay would align the peak powers of the two optical signals, resulting in spikes corresponding to the beat's peak. Such behavior would result in ambiguity between the beat's rising and falling edge, and the P-unit 409 would output a spike at the beat's falling edge for frequencies just larger than about 333 MHz.

Ultimately, FIGS. 5E-5I illustrate the P-unit's ability to properly spike at the rising edge of the beat signal for frequency separations ranging from 25 to 240 MHz, based on a fixed temporal delay, FWM, and optical filtering of one of the FWM generated frequencies. The output's tendency to shift towards the beat peak at higher frequencies, such as 240 MHz, results in a minor temporal misalignment between inputs at the logic unit 418 of the JAR circuitry of FIG. 4.

T-Unit & ELL—for the Detection of the Reference Signal's Positive Zero Crossing Points.

Figure 6A:
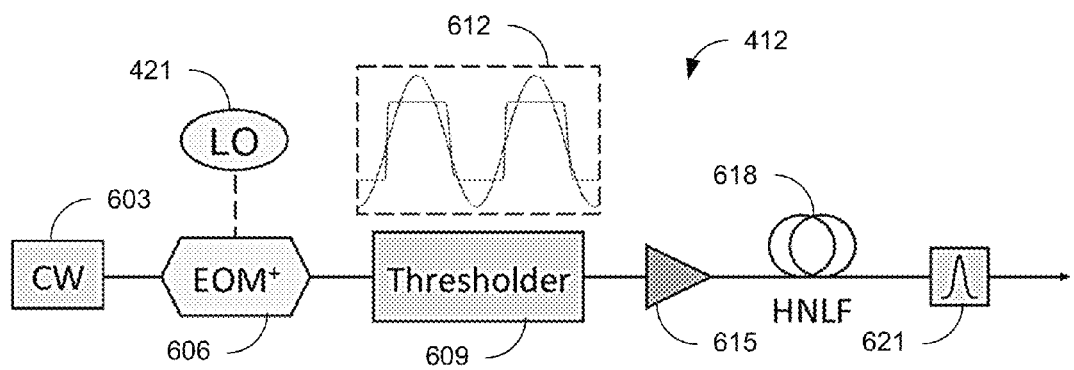
FIG. 6A is a schematic diagram illustrating an example of ELL/T-unit circuitry of the photonic JAR system of FIG. 4, in accordance with various embodiments of the present disclosure.

Referring to FIG. 6A, shown is a schematic diagram illustrating an example of a T-unit & ELL (or ELL/T-unit) 412 of FIG. 4, with a CW source 603 modulated by an EOM 606 receiving the reference signal directly from the LO 421 (FIG. 4). A nonlinear optical loop mirror (NOLM) based thresholder 609 performs amplitude clamping, as illustrated by the inset 612 of FIG. 6A. An optical amplifier 615 receives the output of the thresholder 609 and supplies a length of nonlinear fiber (HNLF) 618 connected to a bandpass filter 621. In other implementations, different nonlinear optical devices (e.g., a SOA, silicon wire waveguide or photonic crystal fiber can be utilized in place of the HNLF 618.

The ELL/T-unit 412 receives a copy of the reference signal directly from the LO 421 and, because of the fixed distance between the transmitting and receiving antennae, the length of the fiber from the LO 421 can be set so that the reference signal is in phase with the reference signal transmitted and received by the antennae at a later point in the overall system. The system can then locate the positive zero crossing points of the reference signal by means of amplitude clamping, self-phase modulation (SPM), and spectral filtering.

Figure 6B:
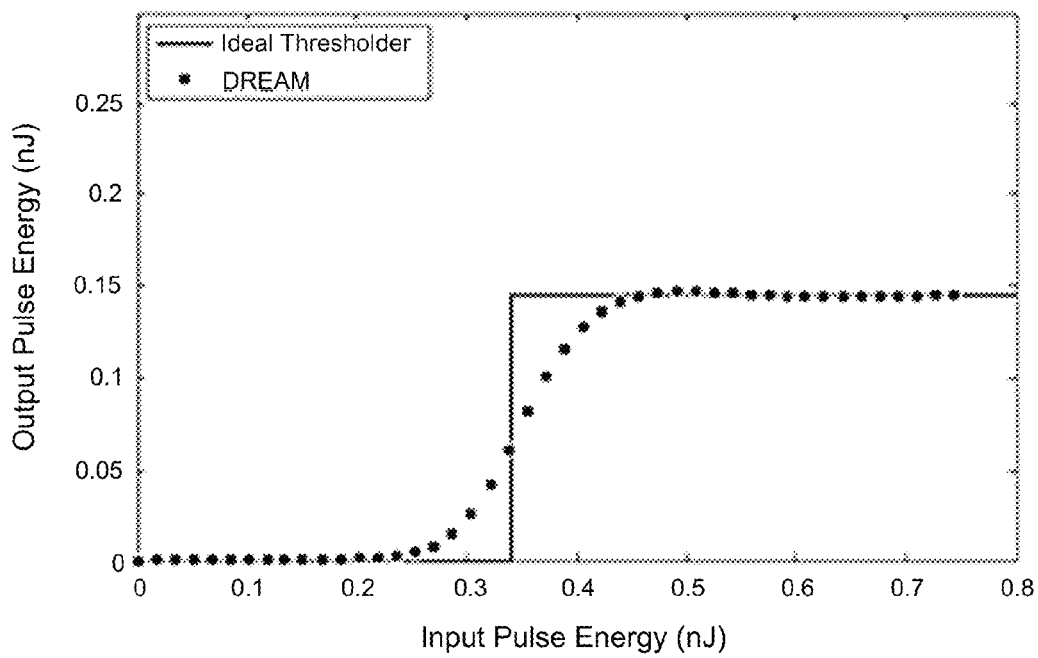
FIGS. 6B through 6D illustrate operation of the ELL/T-unit circuitry of FIG. 6A, in accordance with various embodiments of the present disclosure.

For the first step in this process, the reference sinusoid passes through an optical thresholder 609, similar to those implemented by photonic leaky integrate-and-fire (LIF) neuron models, with transfer functions similar to that of FIG. 6B. FIG. 6B shows the DREAM thresholder transfer function, comparing input and output powers of 10 ps pulses. A similar device would be used for amplitude clamping. The optical thresholder 609 works to suppress signals below a set power threshold and pass those beyond the threshold with a sigmoidal transfer function. Consequently, the sinusoid is clamped in such a way that its crests and troughs are flattened, while the rising and trailing edges are made steeper. To surpass simulating the amplitude clamping effect, non-return-to-zero (NRZ) signal of appropriate width are generated electronically at the same rate as the reference signal frequency and converted to the optical domain using another EOM to modulate the signal onto a 1550 nm continuous wave.

The leading edges of these NRZ signal can be roughly aligned in time with the positive zero crossing points of the reference sinusoid, and a filtering technique similar to NRZ-to-PRZ (pseudo-return-to-zero) signal conversion can be used to extract these edges. Considering the nonlinear properties of fiber, an NRZ signal can induce a minor red shift in its leading edge and a minor blue shift in its trailing edge, and NRZ-to-PRZ conversion is therefore achieved by filtering out the central wavelength of the signal, leaving narrow pulses at the rising and trailing edges of the original NRZ signal. By performing a similar technique, but instead just filtering out the longer wavelength end of the NRZ signal's spectrum, extraction of exclusively the leading edge is possible.

The manifestation of this process within the photonic JAR circuit involves first sending the optical NRZ signal through another length of HNLF 618, in which SPM occurs, broadening the spectrum and simultaneously inducing further red shifts and blue shifts. SPM is a nonlinear phenomenon describing how a medium's index of refractive changes proportionally to input optical intensity, resulting in a shift towards the longer wavelengths at the leading edge and a shift towards shorter wavelengths at the trailing edge of a pulse. Then, the signal passes through an optical bandpass filter 621 (e.g., with a 0.3 nm bandwidth centered at 1550.52 nm) at the longer wavelength side of the original pulses, and output of the ELL/T-unit 412 is acquired. While extraction of the zero crossing point can be done directly with the reference sinusoid, the use of thresholder to convert the sinusoid into an NRZ signal does enhance the SPM effect for generating a stronger and sharper zero-crossing pulses.

Figure 6C:
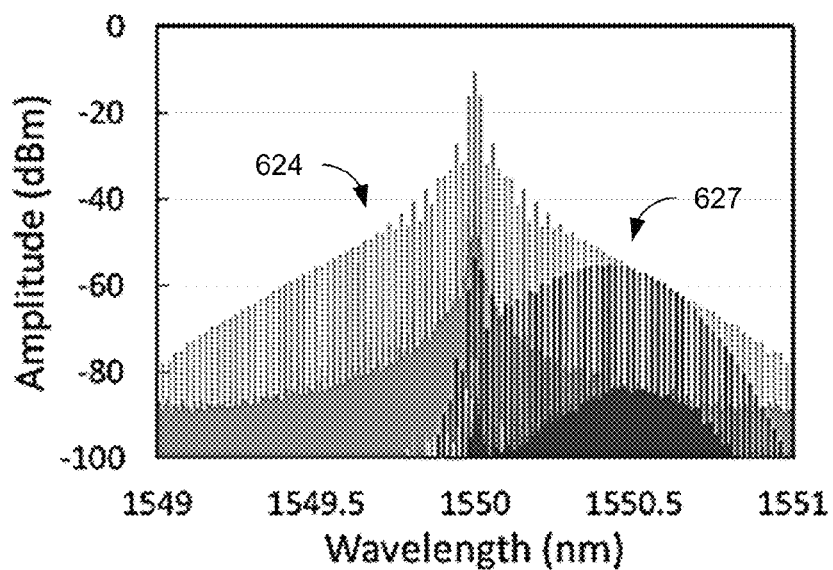
Figure 6D:
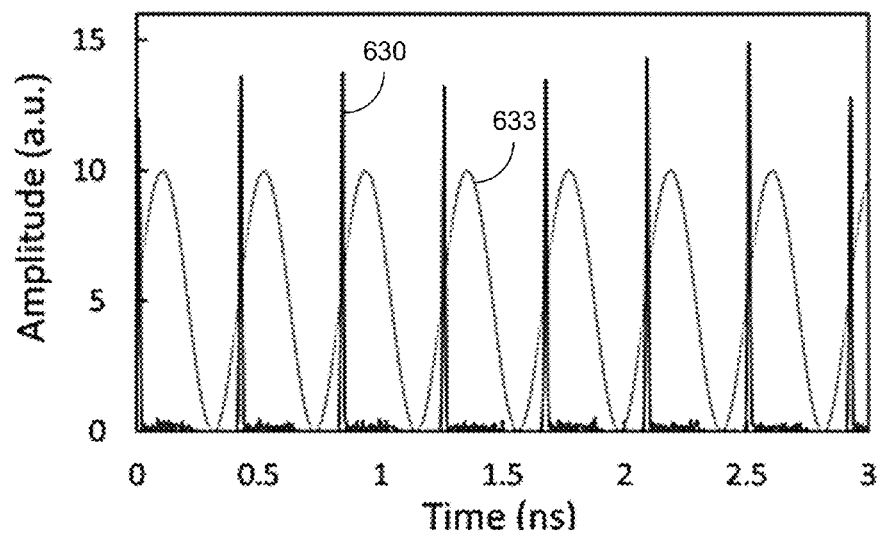

FIGS. 6C and 6D show the frequency and time domain simulation outcome for this technique performed on a 2.4 GHz NRZ signal. FIG. 6C shows the NRZ signal spectrum 624 and the filtered leading edge spectrum 627. In FIG. 6D, the 2.4 GHz positive zero crossing point pulses shown in curve 630 with a 2.4 GHz reference sinusoid shown as curve 633. A train of narrow optical pulses, in synch with the positive zero crossings of the reference signal and an average power of −7.8 dBm, is emitted and sent to the TS unit 415 (FIG. 4), where phase information is processed.

TS Unit—for Determine the Phase of the Beat Signal Relative to the Reference Signal.

Figure 7A:
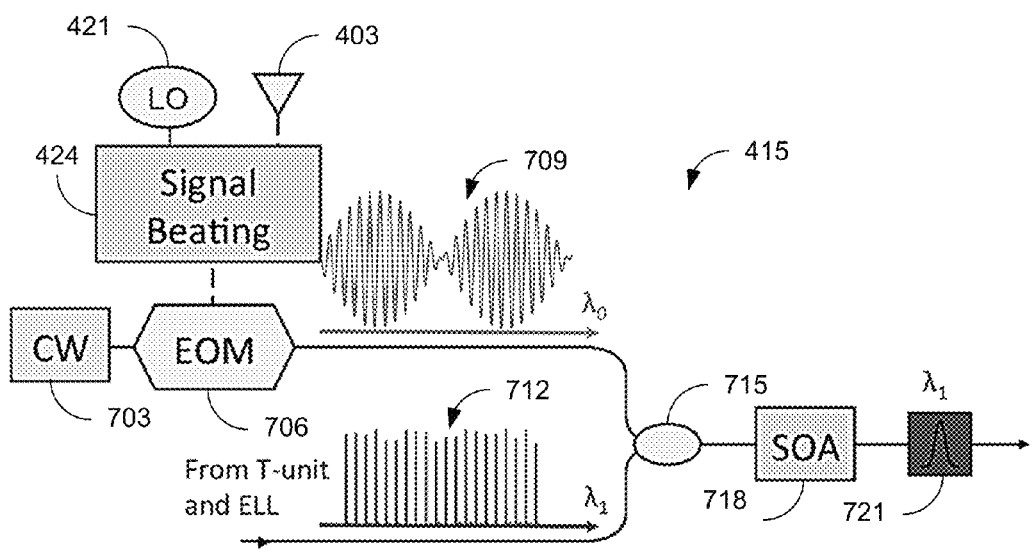
FIG. 7A is a schematic diagram illustrating an example of a TS unit circuitry of the photonic JAR circuitry of FIG. 4, in accordance with various embodiments of the present disclosure.

Referring to FIG. 7A, shown is a schematic diagram illustrating an example of a TS unit 415 of FIG. 4. FIG. 7A shows the beat signal 709 modulated onto an optical carrier (at $\lambda_0$) from CW optical source 703 by an EOM 706 and the pulse train 712 (at $\lambda_1$) generated from the ELL/T-unit 412. Both inputs 709 and 712 are coupled together by a fiber coupler 715 and sent to a semiconductor optical amplifier (SOA) 718 and a bandpass filter 721 (at $\lambda_1$) passes the pulse train. Ultimately, the output of the TS unit 415 indicates at which points the interfering signal is lagging behind that of the reference.

The TS unit 415 in FIG. 7A receives an input from the ELL/T-unit 412 and directly from the receiver 403 via the antenna and the signal beating device 424. The TS 415 includes a SOA 718, which is utilized in a manner representative of an integrator in a photonic neuron, and serves to indicate at which times the interfering signal lags the reference signal in phase. A electro-absorption modulator (EAM) based photonic neuron integrator can also be used. First, the beating signals are converted to the optical domain by an EOM 706, modulating the interference pattern onto a 1555 nm optical carrier. Then, this new optical signal with an average power of −8.7 dBm is sent to the SOA 718 alongside the positive zero crossing pulses (attenuated to an average power below −25 dBm) at 1550 nm, which act similarly to the sampling pulses of an LIF photonic neuron. A 2 nm bandpass filter 721 centered at 1550 nm can be used to pass the sampling pulse train 712, whose pulses' amplitudes are altered by cross-gain modulation (XGM).

Figure 7B:
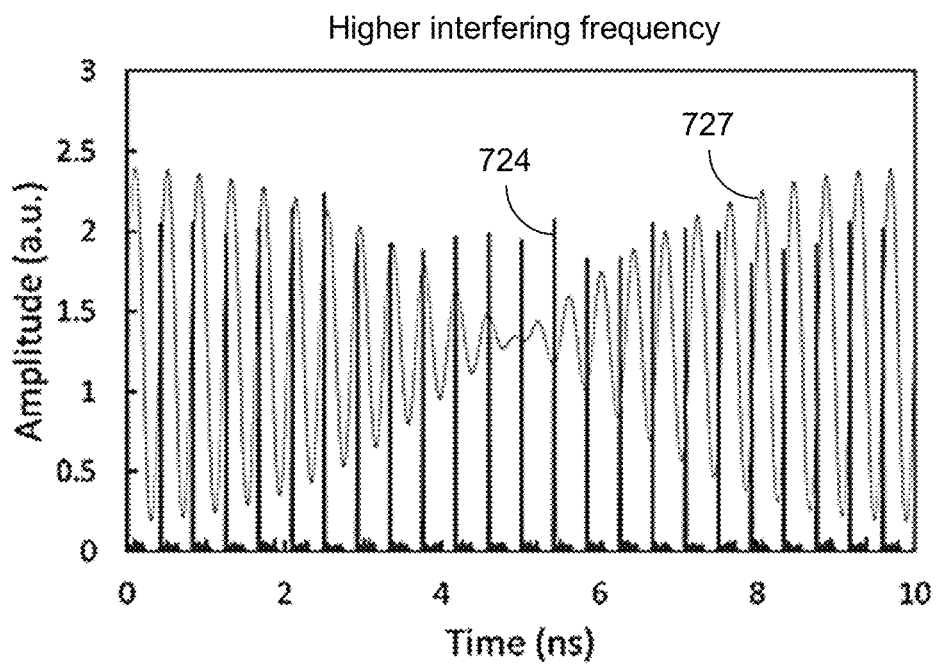
FIGS. 7B through 7E illustrate operation of the TS unit of FIG. 7A, in accordance with various embodiments of the present disclosure.
Figure 7C:
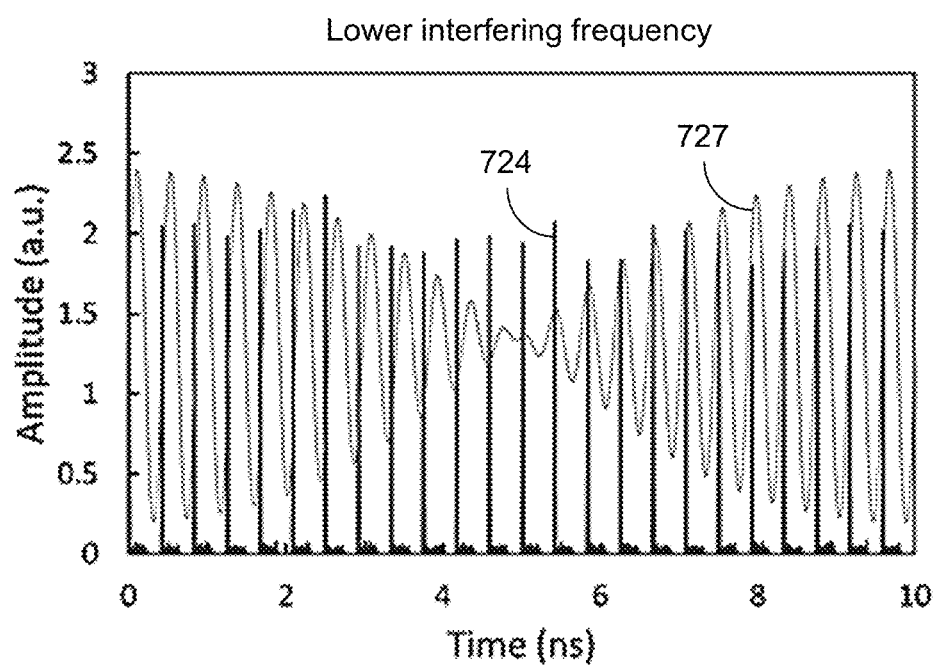
Figure 7D:
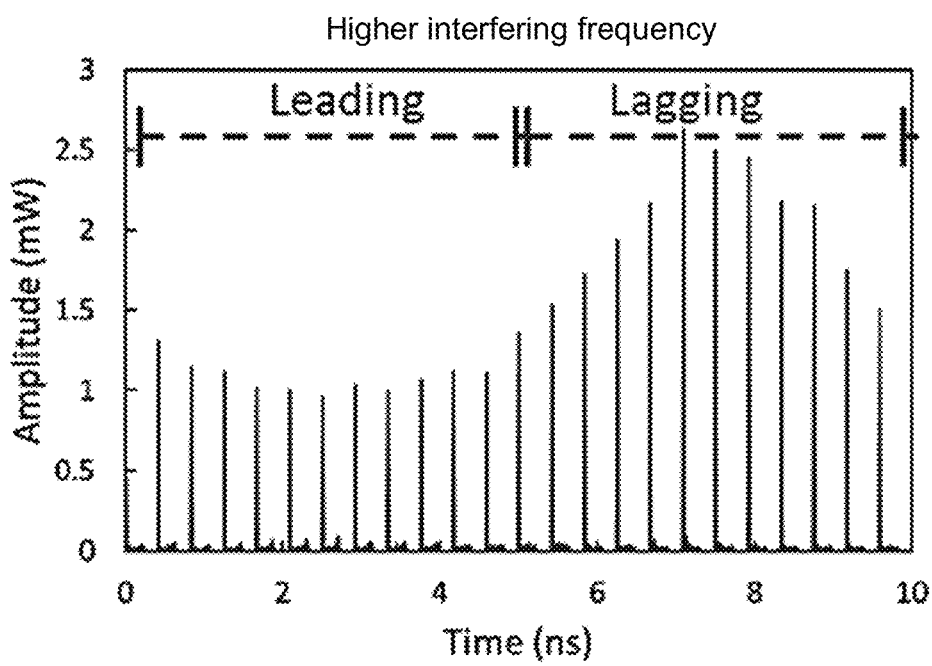
Figure 7E:
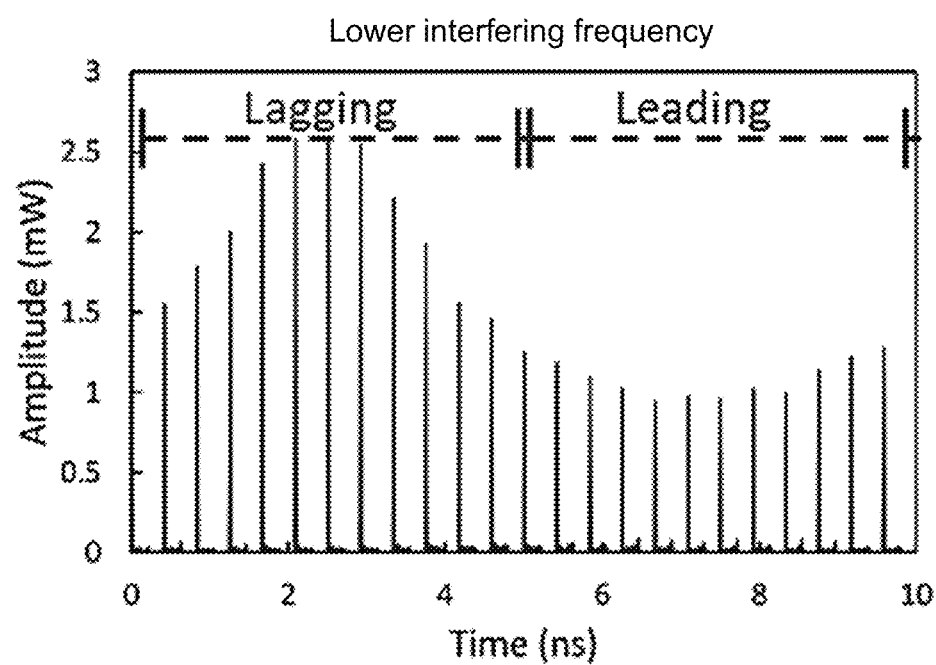
Figure 9C:
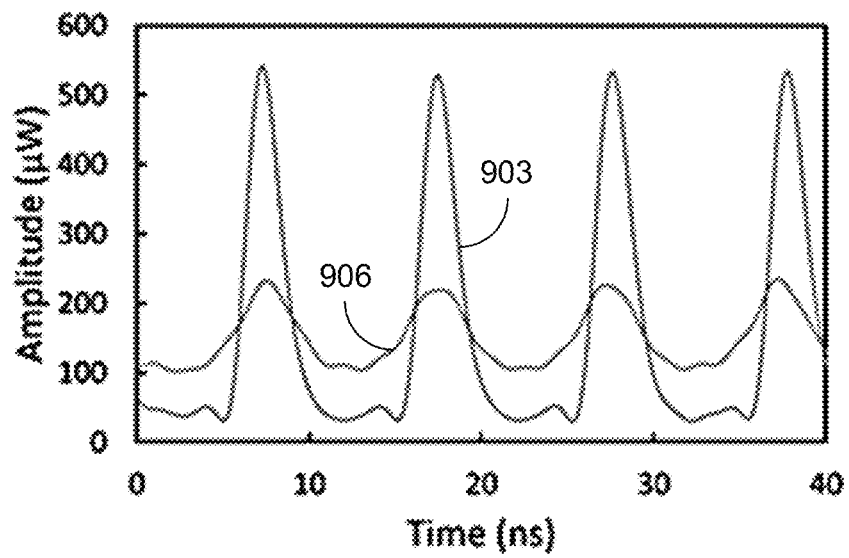
Figure 9D:
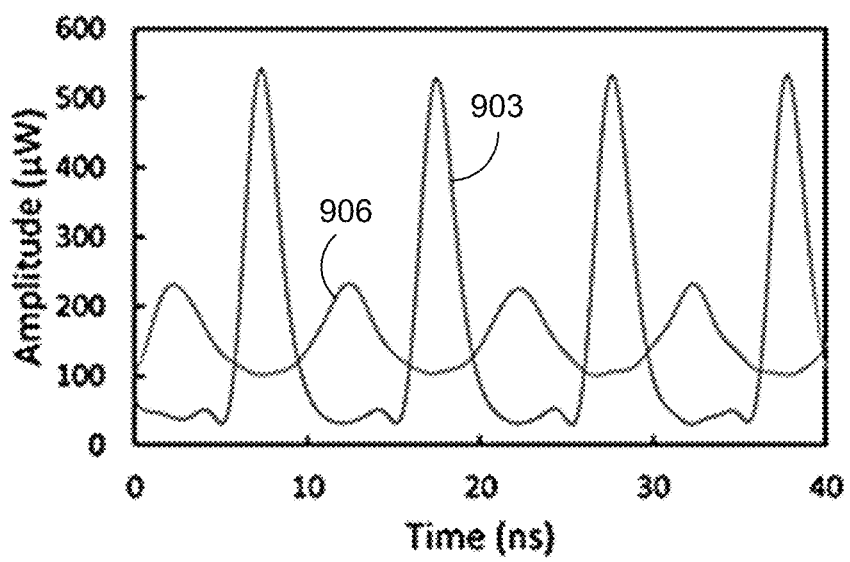
Figure 9E:
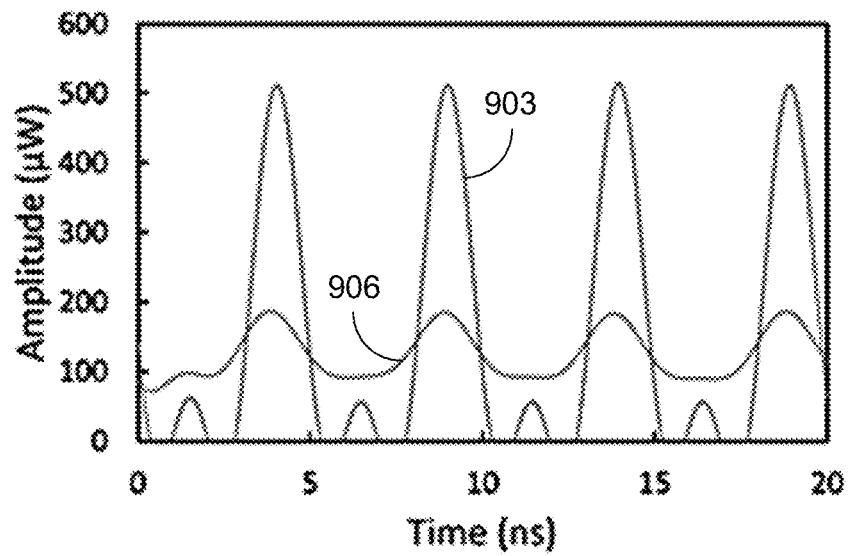
Figure 9F:
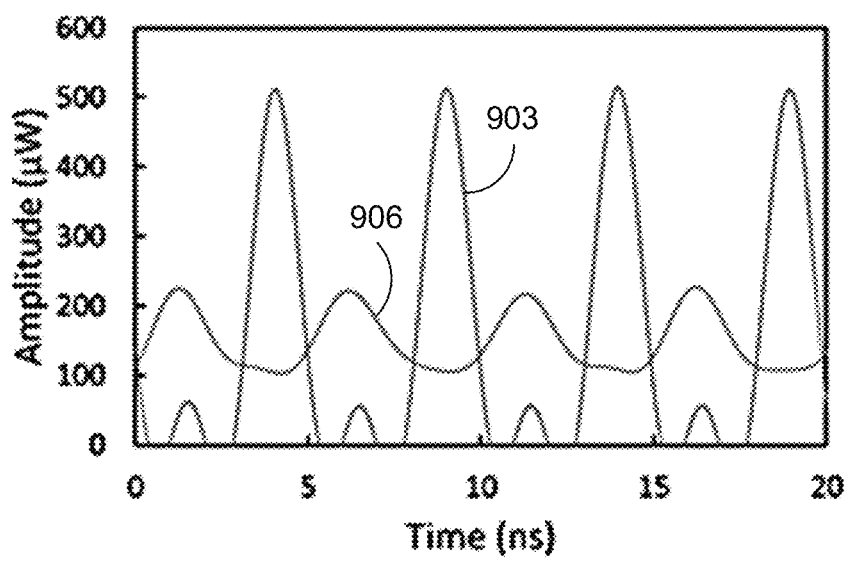
Figure 9G:
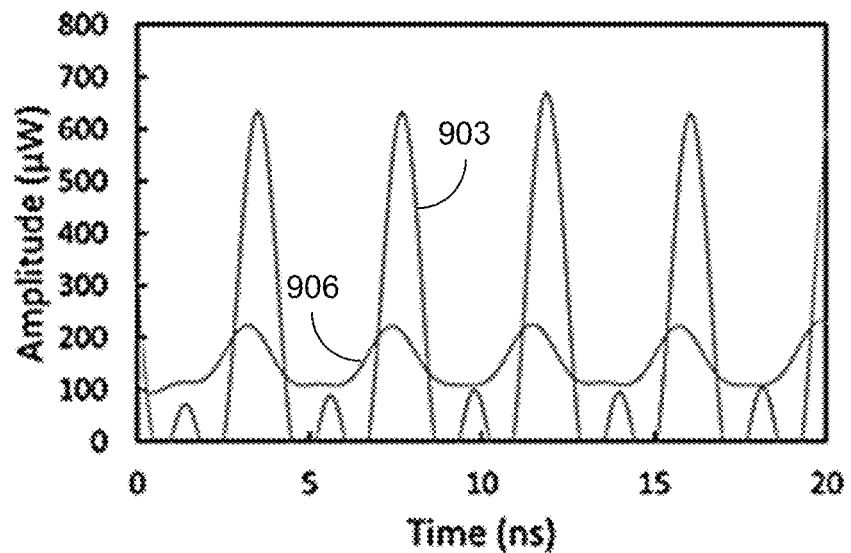
Figure 9H:
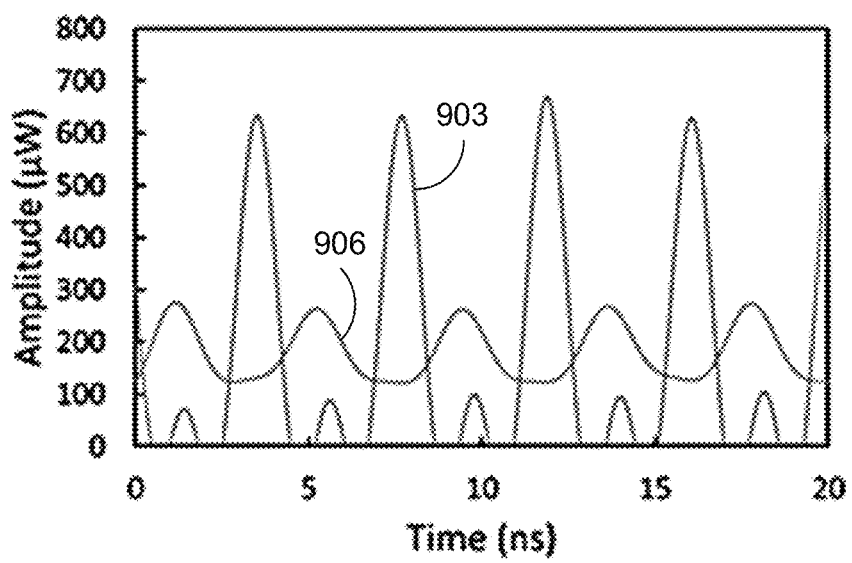

FIGS. 7B-7E shows both inputs for two different scenarios, in which the interfering signal is either 100 MHz above (FIG. 7B) or below (FIG. 7C) a 2.4 GHz reference signal. In the comparison of the TS inputs and outputs for 100 MHz separations between reference and interfering frequencies, the zero crossing pulses are show as 724 and beat signal as 727. FIG. 7B shows the TS inputs for a 2.4 GHz reference signal and a 2.5 GHz interfering signal and FIG. 7C shows the TS inputs for a 2.4 GHz reference signal and a 2.3 GHz interfering signal. The TS outputs are pictured in the two scenarios, showing that the crossing point pulses are amplified the most when the beat signal is lagging behind the reference signal. FIG. 7D shows when the beat frequency is greater than the reference frequency by 100 MHz, and FIG. 7E shows when the interfering frequency is less than the reference frequency by 100 MHz. Time intervals at which the beat signal is lagging and leading are indicated by the red text and blue text, respectively.

As can be seen from FIG. 7B, the zero-crossing pulses are temporally closer to the individual peaks in the beat signal at the falling envelope of the beat than they are at the rising envelope. The exact opposite relationship is observable in FIG. 7C, which corresponds to the scenario in which the interfering signal is lower in frequency than the reference signal. When filtering out the zero-crossing pulses by means of an optical bandpass filter 721 (FIG. 7A) with a 2 nm bandwidth centered at 1550 nm, different outputs are observed for the two scenarios as a result of the SOA's gain dynamics.

In FIG. 7B, the pulses and peaks at the beat's rising envelop are spaced out such that the SOA 718 (FIG. 7A) has adequate time to recover between inputs, such that the beat signal will not deplete the gain experienced by the pulses, and the output pulses are thus amplified to a further extent at these times; however, at the falling envelope of the beat, the pulses are temporally closer to the small peaks and thus the gain experienced by the pulses are depleted by the beat signal peaks, thus experience minimal amplification. As such, the output depicted in FIG. 7D results. When the interfering signal is lower in frequency, however, the output shown in FIG. 7E occurs due to the now increased spacing between pulses and beat peaks at the beat's falling edge and decreased spacing at the rising edge. The spiking behavior directly relays phase information of the beat signal. For instance, when the interfering frequency is lower than the reference frequency, the rising edge of the resulting beat envelope always occurs when the beat signal's positive zero crossings are leading the reference's crossing points, and the falling edge always corresponds to the beat signal's crossings lagging behind that of the reference's. The opposite behavior is observed when the interfering frequency is higher than the reference frequency. Consequently, this TS implementation 415, which is of a basic design, is reminiscent of the very first LIF photonic neuron and outputs a "1"

when the beat signal is lagging behind the reference signal and an effective "0" when the beat signal leads the reference signal.

The TS unit 415, while successful in conveying the necessary phase information, does not produce the most ideal output. For instance, some of the techniques used by more complete photonic neuron models could be utilized to clean up the TS output. Thresholding by means of a nonlinear optical loop mirror (NOLM) can suppress the zero level of the signal, which can make for easier signal processing at later stages of the photonic JAR circuit, and an inverter and second thresholder could further serve to increase the disparity between ones and zeros while reversing the logic of the output. The device would then output spikes when the interfering signal leads the reference signal and transmit nothing when the interfering signal lags behind the reference signal.

Logic Unit—for Determination of Output Frequency Adjustment.

The logic unit 418 of the photonic JAR circuit processes the amplitude and phase information acquired from the P-unit 409 and the TS 415, making a final decision as to whether or not the transmission frequency is in need of adjustment and in what direction. Operating as a basic XOR or XNOR gate, the decision from the logic unit 418 is summarized in the table of FIG. 8, which lists the decisions based on amplitude and phase information. For this system, a spike from the P-unit 409 marks the rising edge of the beat envelop, and a strong spike from the TS 415 indicates times at which the beat signal is lagging behind the reference signal; however, the logic of the TS 415 can easily be reversed with additional photonic neural components. The inputs of the logic unit 418 are both in the optical domain, and several approaches for XOR or XNOR logic can be applied with this system. With beat frequencies in the MHz range, electrical processing can be used instead of optical processing.

FIGS. 9A-9H show the inputs for several different interference scenarios after conversion to the electrical domain by photodetectors and passage through 500 MHz low-pass filters. The logic inputs are shown for a 2.4 GHz reference and an interfering signal of 25 MHz higher in FIG. 9A, of 25 MHz lower in FIG. 9B, for 100 MHz higher in FIG. 9C, for 100 MHz lower in FIG. 9D, for 200 MHz higher in FIG. 9E, for 200 MHz lower in FIG. 9F, for 240 MHz higher in FIG. 9G, and for 240 MHz lower for FIG. 9H. The filtering was implemented because of the different nature of P-unit 409 and TS 415 outputs 903 and 906, respectively, with the P-unit 409 transmitting nanosecond-width pulses at MHz repetition rates, and the TS 415 emitting ultrashort, picosecond width pulses at GHz repetition rates.

Without adjusting the system parameters for any of the simulation trials, the P-unit 409 and TS 415 exhibit the proper spiking behavior for the situations in which the interfering signal was up to 240 MHz higher or lower in frequency than a reference signal at 2.4 GHz. It was noted that, in some trials, the amplitudes of the TS 415 spikes 906 and P-unit 409 spikes 903 varied by as much as 300 µW. While the "zero"-level of the TS output 906 was maintained at around 100 µW for all trials, there exists variance in pulse widths between the logic inputs. Particularly at the lower frequencies, the logic inputs did not appear to be temporally aligned, and the pulse shape indicates that weak FWM was occurring along the falling edge of the beat as well.

More precise adjustment of the system parameters can eliminate or mitigate several of these issues. Adding a fixed attenuator to the P-unit 409 or fine tuning of the TS inputs may result in a more even match in amplitude for the logic inputs. Attenuation and amplification of the crossing point pulses and beat signal TS inputs, along with optimization of the SOA driving current or thresholding and inversion techniques, can significantly alter the TS output. Also, the P-unit output at low frequencies may be minimized by optimizing the driving current to the system's amplifier preceding the HNLF. By determining the ideal bias current, the minor leading spike, as seen in FIG. 5E corresponding to the crossing point of the negative envelope with the positive envelope's falling edge, could be minimized if the two HNLF inputs are not of sufficient power to induce FWM. Lastly, the lack of temporal alignment for the lower frequencies is simply a product of simulation, as the software employed has a difficult time accurately representing a wide range of frequencies in a single program.

Also, the results describe how a system with a reference signal fixed at 2.4 GHz would respond to different interfering frequencies, when in actuality the reference frequency can be adjusting depending on the logic circuit output. The decision to keep the reference frequency fixed and observe the circuit's response to difference interfering frequencies was made due to simulation limitations. The OptiSystem simulation operates on a predefined bit rate upon which the generation of the NRZ pulses, and thus the positive zero crossing point detection, depends on. If the reference frequency were adjusted from 2.4 GHz by several megahertz, the fixed bit rate of the simulation would result in an erroneous depiction of the reference signal's crossing points. Despite this shortcoming, the simulations indicate the ability of the photonic JAR system to properly respond to a range of frequency differences, and adjustment of the interfering frequency directly parallels the adjustment of the reference frequency.

The photonic JAR circuit of this disclosure produces the necessary spiking patterns on which a basic XOR logic gate can operate. For this basic model, a fixed low-pass filter at 250 MHz prevents the P-unit 409 (FIG. 4) from spiking for frequencies sufficiently far from the reference frequency, providing a potential stopping condition for the JAR circuit. The disclosed system does not make use of any strongly frequency-dependent components, allowing for operation over a wide frequency range, with previous simulations successfully operating at frequencies around 10 GHz, and both electrical and optical processing techniques can be implemented in the final decision system. Also, all processing techniques used do not depend on the phase of the interfering signal, ensuring that the location of the interfering signal's transmitter is inconsequential to the circuit's outcome. Other implementations can include complete, autonomous operation of the JAR circuit, including simulation of NOLM thresholding towards generating the positive zero crossing pulses, envelope detection for rising edge detection of the beat, a XOR/XNOR logic operation on the P-unit and TS outputs, and/or an adaptive feedback response that properly adjusts and/or appropriately stops adjusting the reference frequency based on the logic unit's decision. In addition, the disclosed system can be utilized for signals of various modulation formats beyond sinusoids at fixed amplitudes, including a variety of inputs present in a real world environment.

Experimental Results of Photonic JAR

The Eigenmannia performs each task through spike processing, therefore multiple neurons and units may be needed for encoding certain functions. From an engineering point of view, it may be redundant to implement two separate devices for the same function. Thus, in the optical implementation of JAR, the circuitry was simplified and make use of photonic phenomena for an efficient photonic JAR. In a radar system, the transmitter (Tx) carrier signal corresponds to the Eigenmannia reference signal. As shown in FIG. 4, the Tx signal can be obtained from the local oscillator (LO) 421, while the interfering signal can be obtained from the receiver (Rx) 403, e.g., after a self-interference cancellation system. During the experiments, a Tx signal frequency in a range from hundreds of MHz to 10 GHz was used, while the interfering signal varied from 240 MHz above the TX signal frequency to 240 MHz below the Tx signal frequency. Both the simulation results and experimental results illustrated the JAR behavior. The experimental version of the JAR is designed for performance optimization and potential device integration.

Figure 10A:
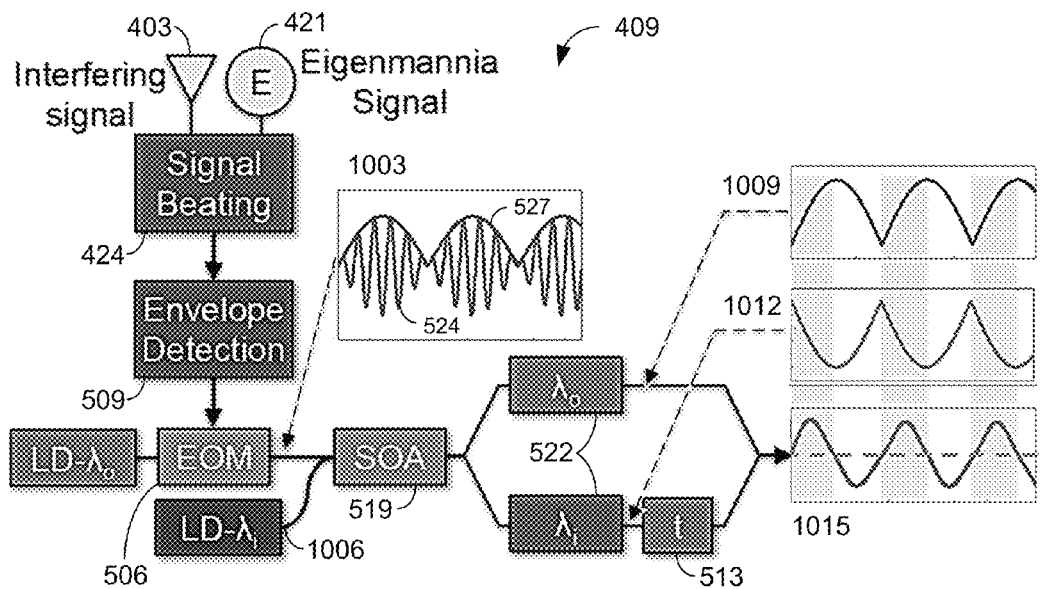
FIG. 10A is a schematic diagram illustrating an example of the photonic JAR circuitry used for testing, in accordance with various embodiments of the present disclosure.

The first unit in the JAR system is a P-unit 409, which is used for the discrimination of increasing or decreasing amplitude in the beat envelope. Referring to FIG. 10A, shown is a schematic diagram illustrating an embodiment of the photonic P-unit 409, which is based on temporal offset and subtraction of signals. The optical P-unit 409 was implemented by performing electrical-to-optical conversion of the beat signal envelope 527 through the use of an electro-optic modulator (EOM) 506, as illustrated in 1003. Due to the close frequency difference between the reference signal and interfering signal (<hundreds of MHz), envelope detection of the beat signal 524 can be done electrically.

Figure 10B:
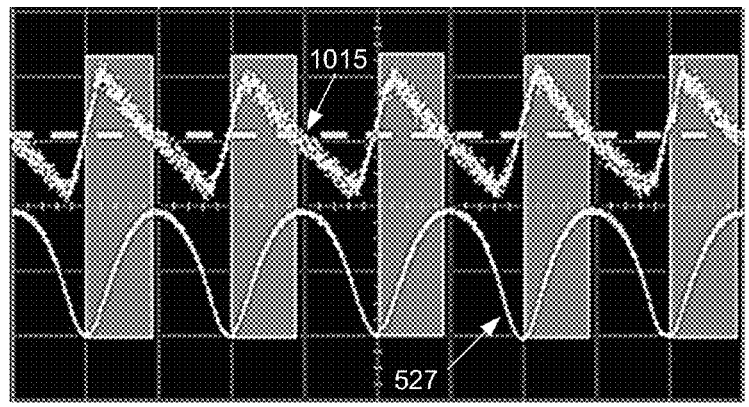

The optical envelope signal 527 was combined with a continuous wave laser output 1006 at a different wavelength, and launched into a semiconductor optical amplifier (SOA) 519 for cross gain modulation, such that both a non-inverted copy 1009 and an inverted copy 1012 of the beat signal envelope 527 were obtained. Optical bandpass filters 522 were used to separate the two signals, with the inverted signal 1012 temporally delayed 513 by a fixed amount of time (e.g., 1.5 ns) and combined with the non-inverted signal 1009 by an optical coupler. Due to the temporal offset, the combined signal 1015 is at peak power during the increasing envelope of the beat signal envelope 527. Therefore, a rising envelope can be identified by a "bit 1" at the P-unit output. In the experiment, the frequency sensitivity (the maximum frequency difference between the Eigenmannia reference signal and the interfering signal for enabling JAR) was set to be 150 MHz. The results shown here correspond to a reference signal at 1 GHz while the interfering signal was at 1.01 GHz. The input and output waveforms of the P-unit 409 are shown in FIG. 10B, with the lower curve as the beat signal envelope 527 and the upper curve as the P-unit output 1015. It can be seen that the P-unit 409 returned a level "1" during the increasing amplitude portion of the beat signal (shaded areas), but not during the decreasing portion.

Figure 10C:
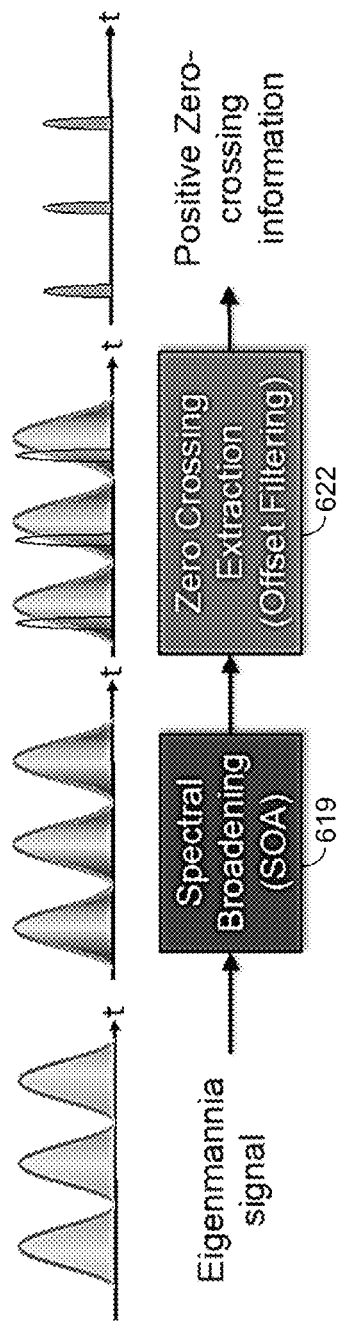
Figure 10D:
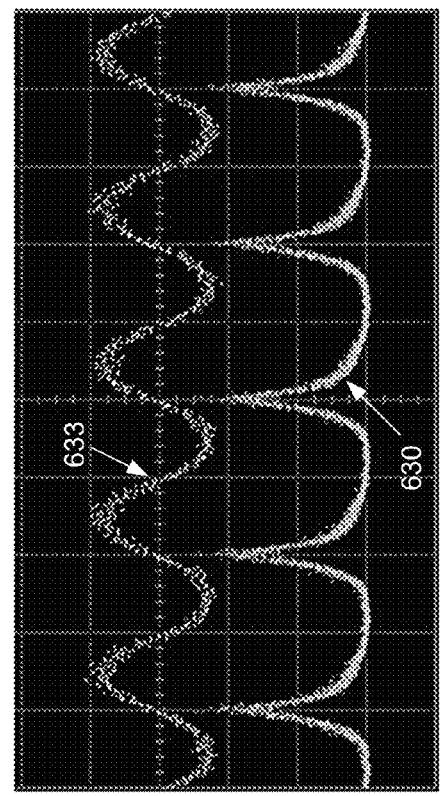

The next unit is the ELL/T-unit 412, which is responsible for identifying the positive zero crossing points in the Tx signal. An embodiment for positive zero crossing detection is illustrated in FIG. 10C. The ELL/T-unit 412 received a copy of the Tx signal directly from the LO 421, which was converted to the optical domain reference signal through electrical to optical conversion. The optical reference signal was then passed through a SOA 619 (e.g., an optical nonlinear medium to experience self-phase modulation) such that the rising edge of the reference signal induced a shift to the longer wavelength direction and the falling edge induces a shift to the shorter wavelength direction (spectral broadening). Then, the positive zero crossing region of the sinusoidal signal was extracted based on offset filtering 622 of the spectrally shifted output. FIG. 10D shows the output pulses 630 from the ELL/T-unit 412, which are aligned with the positive zero crossing points of the sinusoidal Tx signal 633, indicating that the positive zero crossing points were successfully identified by the ELL/T-unit 412.

Next, the TS unit 415 receives the positive zero crossing information from the ELL/T-unit 412 along with a copy of the beating signal envelope between Tx (reference) and interfering signals, and determines whether the beat signal is leading or lagging the Tx signal. FIGS. 10E and 10F show examples of the inputs and outputs of the TS unit 415 for 10 MHz separations between a 1 GHz Tx signal and the interfering signal. For example, if the positive zero crossing points are aligned with the positive amplitude of the beat signal, that means the beat signal is leading the Tx signal; however if the positive zero crossing pulses are aligned with the negative amplitude of the beat signal, the beat signal is lagging the Tx signal. To realize this, the optical version of the beat signal 524 (FIG. 10A) is combined with the zero crossing pulses 630 (FIG. 10D) and launched into a semiconductor optical amplifier (SOA) for cross-gain modulation. If the positive zero crossing pulses are slightly behind but very close temporally to the beating signal peaks, the output pulses after the SOA will be weakened; however, if the positive zero crossing pulses are in front of the beat signal peaks, the output pulses will be strengthened.

To exemplify the process experimentally, two different scenarios in which the interfering signal was either 10 MHz below or above a 1 GHz reference signal ($f_I < f_E$ or $f_I > f_E$) are shown in FIGS. 10E and 10F, respectively. The plots indicate the beat signal 524 and the output 1018 of the TS unit 415. As can be seen from FIG. 10E, the zero crossing pulses were suppressed during the first half (shaded region) of the beat signal 524, while the pulses were strengthened during the second half of the beat signal 524. This condition corresponds to the interfering signal being lower in frequency than the Tx (reference) signal. The exact opposite relationship is observable in FIG. 10F, which corresponds to the interfering signal being higher in frequency than the Tx signal. Here, the TS unit output pulses 1018 with a stronger amplitude during the first half (shaded region) of the beat signal 524 mean that the phase of the beat signal is lagging the Tx signal, while pulses with weaker amplitude during the second half correspond to leading phase. The pulse amplitude directly provides phase information of the interfering signal.

The final units of the JAR system is the logic unit 418 and frequency adjustment (or control) unit 427 (FIG. 4), which processes the amplitude and phase information acquired from the P-unit 409 and the TS unit 415, making a final decision as to whether or not the Tx frequency is in need of adjustment and in what direction. The control unit 427 will regulate the control to the LO signal generator 421 by taking into account the JAR logic decision. For this system, a peak from the P-unit 409 marks the rising edge of the beat signal envelope 527, and strong pulses 1018 from the TS-unit 415 indicate times at which the beat signal is lagging behind the Tx (reference) signal; thus an XOR logic operation can be utilized by the logic unit 418 to return a "1" for an increase in frequency and a "0" for a decrease in frequency. The XOR operation can be implemented either optically or electrically, depending on the actual system requirements. In this study, the JAR process was enabled only when the interfering signal was within the hundreds of MHz range of the reference signal. Consequently, the resultant logic operation was carried out electrically due to the low frequency of the signal. A low-speed photodetector with a hundreds of MHz bandwidth was used for converting the optical signal to the electrical domain as well as band-limiting the signals. FIG.

Figures 10H, 10I:
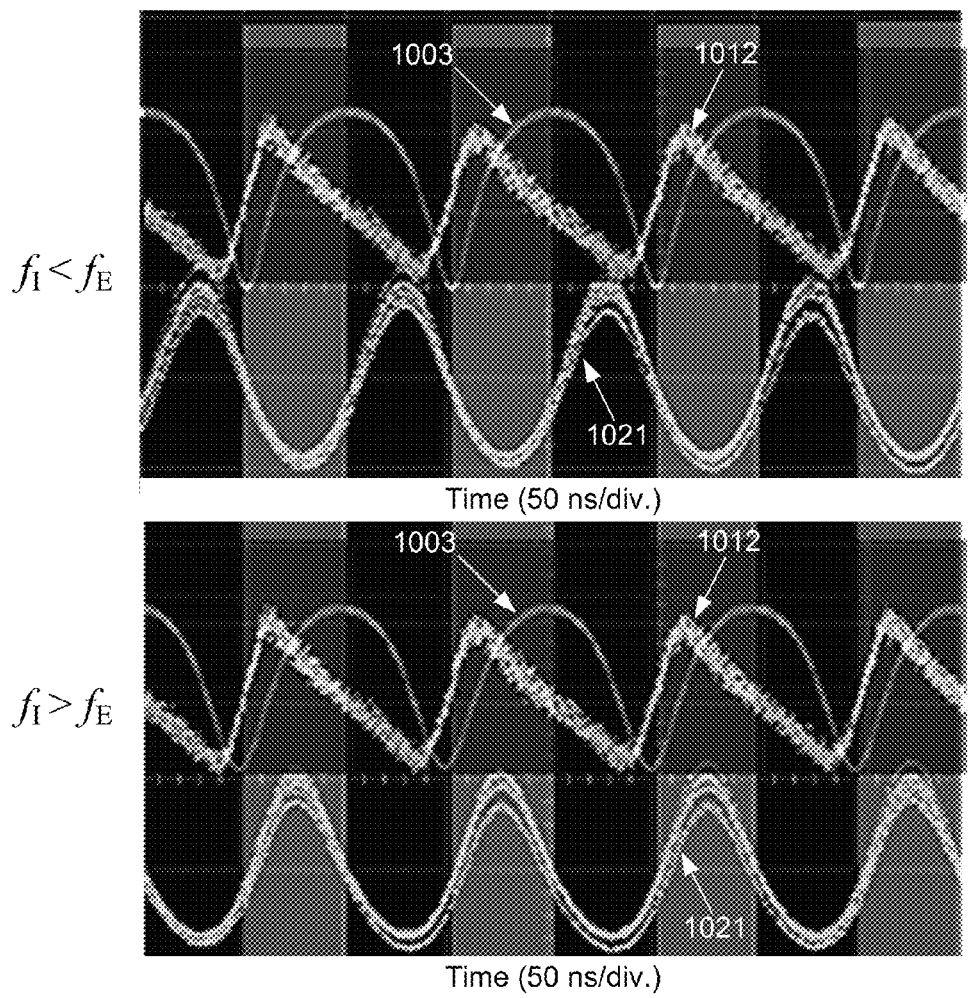
FIGS. 10H-10L shows waveforms generated by the photonic JAR circuitry of FIG. 10A, in accordance with various embodiments of the present disclosure.

10G illustrates the logic unit 418 and control unit 427 used for testing. The circuitry included a XOR gate that received phase information from the TS unit 415 and amplitude information from the P-unit 409 to determine the frequency shifting direction, a bias to provide a DC offset to the integrator for proper operation, while an integrator was used to hold the driving voltage of the LO 421. The XOR gate can be enabled to provide an output when the jamming signal frequency is within a defined range of the Tx (reference) frequency (e.g., equal to and/or less than a predefined frequency difference), and no output when the jamming signal frequency is outside the defined range. FIGS. 10H and 10I show the corresponding inputs to the XOR logic, in different scenarios. The amplitude information 1015 corresponds to the peaks from the P-unit 409 marking the rising edge of the beat signal envelope 527, while the envelope 1021 of the phase information 1018 is detected using an envelope detector, that corresponds to the detected strong pulses from the TS unit 415, which indicate times at which the beat signal is lagging behind the Tx signal or leading the Tx signal.

FIG. 10H shows the case where the interference signal is at a lower frequency than the Tx signal ($f_I < f_E$), with a frequency difference of 10 MHz. While FIG. 10I shows the case where the interference signals are higher in frequency than that of the Tx signal $f_I > f_E$), with a frequency difference of 10 MHz. According to the XOR logic operation, FIG. 10H produces a high logic level at the output of the logic unit 418, while FIG. 10I produces a low level at the output. A high level indicates that an increase in frequency is needed, while a low level indicates that a decrease in frequency is needed. The logic output is then provided to the control unit 427 to control the Eigenmannia (Tx signal) signal generator (LO 421) accordingly. The above experiment demonstrates that the optical implementation of the JAR circuit is capable of operating at a much higher frequency and wider frequency range than that of its biological counterpart.

Figure 10J:
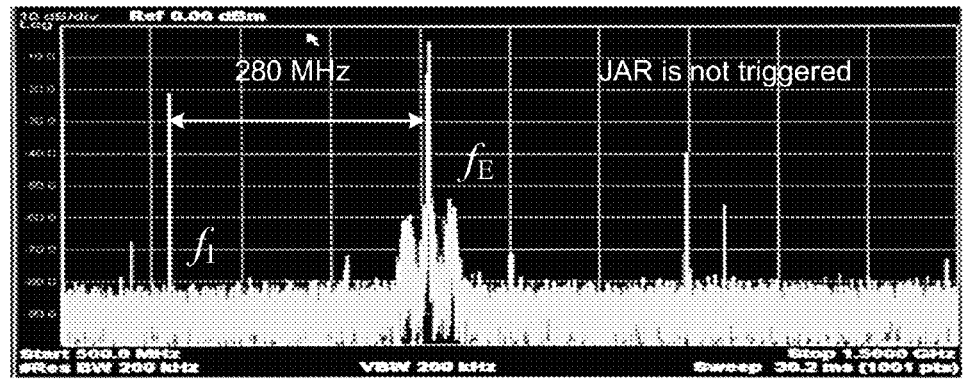
Figure 10K:
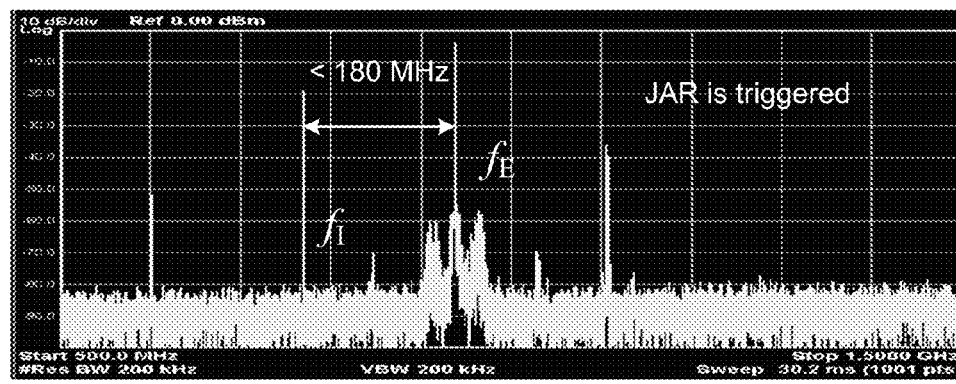
Figure 10L:
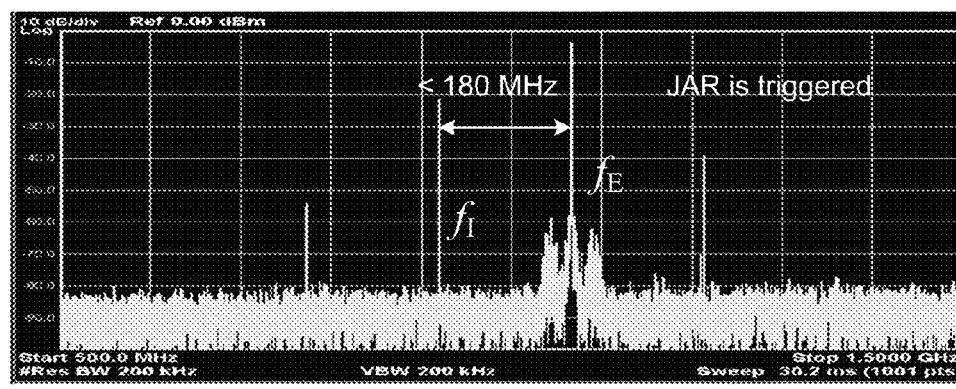

The decision made by the logic unit 418 and control unit 427 will be launched back to the LO 421 of the Tx, such that a corresponding frequency change can be made automatically to avoid jamming. In this experiment, the JAR circuit was triggered when the jamming signal was 180 MHz or less away from the Tx (reference) frequency. This can be adjusted by controlling the bandwidth of the low pass filter before the first envelope detector. FIGS. 10J-10L show the photonic JAR system in action. FIG. 10J illustrate when the jamming signal is >150 MHz from the Tx frequency, so that the JAR system will not be enabled. When the jamming signal approaches the Tx frequency (<180 MHz away), the JAR system can be enabled. FIG. 10K illustrates that the Tx frequency is pushed to a higher frequency. As the jamming signal keeps moving to the higher frequency, the Tx frequency will be pushed to an even higher frequency by the JAR system. In this way, the interfering signal can never get closer than 180 MHz from the Tx frequency, as illustrated in FIG. 10L.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A jamming avoidance response (JAR) system, comprising:
    a photonic P-unit configured to generate optical pulses that correspond to a raising envelope of a beat signal associated with an interference signal and a reference signal;
    a photonic ELL/T-unit configured to generate optical spikes that correspond to positive zero crossing points of the reference signal;
    a photonic TS unit configured to provide a phase output that indicates whether the beat signal is leading or lagging the reference signal, the phase output based at least in part upon the optical spikes; and
    a logic unit configured to determine an adjustment to a reference frequency based at least in part upon the optical pulses and the phase output.

2. The JAR system of claim 1, wherein the photonic P-unit comprises:
    an envelope detector configured to generate an envelope signal corresponding to the beat signal;
    a first electro-optic intensity modulator (EOM) configured to generate an amplitude modulated optical signal based upon the envelope signal;
    a second EOM configured to generate an inverted amplitude modulated optical signal based upon the envelope signal;
    a temporal delay configured to delay the inverted amplitude modulated optical signal by a predefined amount of time to produce a delayed inverted amplitude modulated optical signal;
    a fiber coupler configured to add intensities of the amplitude modulated optical signal and the delayed inverted amplitude modulated optical signal to produce a combined optical signal; and
    a length of highly nonlinear fiber (HNLF) that generates the optical pulses from the combined optical signal.

3. The JAR system of claim 2, wherein the first EOM is biased at a positive slope to generate the amplitude modulated optical signal and the second EOM is biased at a negative slope to generate the inverted amplitude modulated optical signal.

4. The JAR system of claim 2, further comprising a bandpass filter configured to filter the optical pulses from the length of HNLF.

5. The JAR system of claim 2, further comprising an optical amplifier configured to amplify the combined optical signal provided to the length of HNLF.

6. The JAR system of claim 1, wherein the photonic ELL/T-unit comprises:
an electro-optic intensity modulator (EOM) configured to generate an amplitude modulated optical signal based upon the reference signal;
a thresholder configured to clamp an amplitude of the amplitude modulated optical signal to generate a clamped optical signal; and
a length of highly nonlinear fiber (HNLF) that generates the optical spikes from the clamped optical signal.

7. The JAR system of claim 6, further comprising a bandpass filter configured to filter the optical spikes from the length of HNLF.

8. The JAR system of claim 6, further comprising an optical amplifier configured to amplify the clamped optical signal provided to the length of HNLF.

9. The JAR system of claim 1, wherein the photonic TS unit comprises:
an electro-optic intensity modulator (EOM) configured to generate an amplitude modulated optical signal based upon the beat signal;
a fiber coupler configured to add intensities of the amplitude modulated optical signal and the optical spikes from the photonic ELL/T-unit to produce a combined optical signal; and
a semiconductor optical amplifier (SOA) configured to generates the phase output from the combined optical signal.

10. The JAR system of claim 9, further comprising a bandpass filter configured to filter the phase output from the SOA.

11. The JAR system of claim 9, wherein the phase output comprises an optical spike having an amplitude that indicates whether the beat signal is leading or lagging the reference signal.

12. A jamming avoidance response (JAR) method, comprising:
generating optical pulses that correspond to raising envelope of a beat signal associated with an interference signal and a reference signal;
generating optical spikes that correspond to positive zero crossing points of the reference signal;
providing a phase output that indicates whether the beat signal is leading or lagging the reference signal, the phase output based at least in part upon the optical spikes; and
determining an adjustment to the reference frequency based at least in part upon the optical pulses and the phase output.

13. The JAR method of claim 12, wherein generating the optical pulses comprises:
generating an envelope signal corresponding to the beat signal;
generating an amplitude modulated optical signal based upon the envelope signal;
generating an inverted amplitude modulated optical signal based upon the envelope signal;
delaying the inverted amplitude modulated optical signal by a predefined amount of time to produce a delayed inverted amplitude modulated optical signal; and
adding intensities of the amplitude modulated optical signal and the delayed inverted amplitude modulated optical signal to produce a combined optical signal for generation of the optical pulses.

14. The JAR method of claim 13, wherein a length of highly nonlinear fiber (HNLF) generates the optical pulses from the combined optical signal.

15. The JAR method of claim 12, wherein generating the optical spikes comprises:
generating an amplitude modulated optical signal based upon the reference signal; and
clamping an amplitude of the amplitude modulated optical signal to generate a clamped optical signal for generation of the optical spikes.

16. The JAR method of claim 15, wherein a length of highly nonlinear fiber (HNLF) generates the optical spikes from the clamped optical signal.

17. The JAR method of claim 12, wherein providing the phase output comprises:
generating an amplitude modulated optical signal based upon the beat signal; and
adding intensities of the amplitude modulated optical signal and the optical spikes from the photonic ELL/T-unit to produce a combined optical signal for generation of the phase output.

18. The JAR method of claim 17, wherein a semiconductor optical amplifier (SOA) generates the phase output from the combined optical signal.

19. The JAR method of claim 17, wherein the phase output comprises an optical spike having an amplitude that indicates whether the beat signal is leading or lagging the reference signal.

20. The JAR method of claim 12, wherein the reference frequency is increased when the phase output indicates a leading beat signal and the optical pulses indicate an increasing amplitude, or when the phase output indicates a lagging beat signal and the optical pulses indicate a decreasing amplitude.

* * * * *